United States Patent
Takaishi

(10) Patent No.: US 7,027,254 B2
(45) Date of Patent: Apr. 11, 2006

(54) HEAD POSITIONING CONTROL METHOD, DEVICE FOR DISK DEVICE AND DISK DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 298 days.

(21) Appl. No.: 09/742,979

(22) Filed: Dec. 20, 2000

(65) Prior Publication Data

US 2001/0021077 A1    Sep. 13, 2001

(30) Foreign Application Priority Data

Mar. 8, 2000    (JP) .............................. 2000-063845

(51) Int. Cl.
*G11B 5/596*    (2006.01)

(52) U.S. Cl. .................................................. 360/77.04

(58) Field of Classification Search .................. 360/48, 360/67, 29, 78.09, 78.04, 78.06, 78.14, 49, 360/77.02

See application file for complete search history.

(56) References Cited

U.S. PATENT DOCUMENTS

| | | | | |
|---|---|---|---|---|
| 4,516,178 A | * | 5/1985 | Lee | 360/78.04 |
| 5,383,068 A | * | 1/1995 | Shimizu et al. | 360/78.06 |
| 5,724,204 A | * | 3/1998 | Shinohara et al. | 360/77.05 |
| 5,822,144 A | * | 10/1998 | Takahashi | 360/67 |
| 6,049,438 A | * | 4/2000 | Serrano et al. | 360/49 |
| 6,122,117 A | * | 9/2000 | Aikawa | 360/29 |
| 6,219,198 B1 | * | 4/2001 | Dobbek et al. | 360/78.04 |
| 6,239,940 B1 | * | 5/2001 | Sasamoto et al. | 360/78.09 |

FOREIGN PATENT DOCUMENTS

JP    5-242618 A    9/1993

* cited by examiner

*Primary Examiner*—K. Wong
(74) *Attorney, Agent, or Firm*—Greer, Burns & Crain, Ltd.

(57) ABSTRACT

A disk device for positioning a head to read a disk medium at a predetermined position demodulates accurate demodulation positions even when the head is moving. In a disk device that includes a disk medium, a head, an actuator and a control circuit, the demodulation result is determined from the position signal of the head and speed is corrected by a correction value which depends on the moving speed of the head. Since the speed is corrected, accurate positions can be demodulated even when the head is moving.

12 Claims, 26 Drawing Sheets

PRIOR ART

HEAD POSITIONING CONTROL METHOD, DEVICE FOR DISK DEVICE AND DISK DEVICE

BACKGROUND OF THE INVENTION

1. Field of the Invention

The present invention relates to a positioning control method, device for positioning the head of a disk device to a target position and a disk device, and more particularly to a positioning control method, device for detecting a head position from a position signal of a disk and a disk device.

2. Description of the Related Art

A disk device which reads a disk storage medium by a head is widely used. For example, a magnetic disk drive which is used as a memory of a computer comprises a magnetic disk, a spindle motor which rotates the magnetic disk, a magnetic head which reads/writes the magnetic disk, and a VCM actuator which positions the magnetic head to the track of the magnetic disk. The recording density of disk drives is dramatically increasing, and the track density of magnetic disks is also increasing. In particular, the use of an MR head for the magnetic head makes it possible to increase density. As a result, high-speed positioning with high accuracy is necessary.

FIG. 25 is a diagram depicting a position signal to describe a prior art, FIG. 26 is a diagram depicting PosN and PosQ thereof, and FIG. 27 is a diagram depicting the relationship between a demodulation position and a real position.

When a recording/reproducing command is received from a computer, the disk drive moves the magnetic head from the current position to the target position. This is called a "seek operation". The seek operation is to shift to the follow control after the coarse control and the settling control. In order to control the magnetic head to the target position and to control the follow at the target position, feedback control is used. Feedback control detects the current position of the head, calculates the positional errors between the target position and the current position, and controls the actuator of the head so that the positional errors are zero.

To detect the current position of the head, a position signal shown in FIG. 25 is recorded on the disk. A position signal consists of a track number and an offset signal. The track number digitally indicates the track position. The offset signal is set to detect the offset position from the track center. In FIG. 25, for example, the offset signal consists of burst servo patterns PosA, PosB, PosC and PosD, which are four phases with a 90 phase shift respectively.

The head reads the position signal of the disk, and the current position is demodulated from the read position signal. The position signal read by the magnetic head is demodulated by the demodulation circuit, and the track number and the offset signal are obtained. The offset signal is obtained from the amplitude of the above mentioned servo signals, and the magnitude is in proportion to the positional deviation from the track center of the track number.

The position signals with two phases, PosN and PosQ, shown in FIG. 26, are demodulated from the amplitude of the servo patterns in FIG. 25. These position signals have a 90 phase deviation. For example, the position signals PosN and PosQ are calculated by the following formulas (1) and (2).

$$PosN = PosA - PosB \quad (1)$$

$$PosQ = PosC - PosD \quad (2)$$

The demodulation position (current position) is demodulated using the linear part of the position signal. This demodulation position is obtained by calculation. For example, the demodulation position (Position) is calculated by the following formula (see for example, Japanese Patent Laid-Open No. H8-195044). In other words, the magnitude of the absolute value abs (PosN) of PosN and the magnitude of the absolute value abs (PosQ) of PosQ are compared, and if abs (PosN)≦abs (PosQ), the following demodulation position is obtained by the following formula (3).

$$Position = -sgn\ (PosQ)*PosN + Track \quad (3)$$

If sgn (PosQ)*even (Track)>0.0, however, the following formula (4) is added to the formula (3).

$$Position += sgn\ (PosQ)*sign\ (PosN)*1.0 \quad (4)$$

If abs (PosN) is not≦abs (PosQ), on the contrary, the following formula (5) is used.

$$Position = sgn\ (PosN)*(PosQ + even\ (Track)*0.5) + Track \quad (5)$$

Here sgn ( ) is a sign of ( ), Track is a track number, and even (Track) is "1" if the track number is an even number, and is "0" if the track number is an odd number. The C language program describes this as follows.

```
if (abs (PosN)≦abs (PosQ)){
Position=-sng (PosQ)*PosN+Track;
if (sgn (PosQ)*even (Track)>0.0)
Position+=sgn (PosQ)*sgn (PosN)*1.0;
} else {
Position=sgn (PosN)*(PosQ+even (PosQ+even (Track)
*0.5)+Track;
}
```

FIG. 26 shows PosN and PosQ at this time, and FIG. 27 shows the relationship between the demodulation position obtained by calculation and the real position.

The conventional demodulation method, however, sets such that an accurate position is obtained when the speed of the head, that is, the speed of the actuator, is zero. In other words, the conventional demodulation method is for obtaining an accurate demodulation position during the above mentioned follow where accuracy is not considered when the speed is not zero. Conventionally, it was known that the head crosses the servo pattern diagonally when the speed of the head is not zero, as shown by the arrow marks in FIG. 26, but the accuracy of the demodulation position in this case is not considered.

Along with the recent demand for higher densities and higher speeds of a disk drive, the accuracy of the demodulation position is also demanded during seek control, that is, when the speed is not zero. For example, for the above mentioned settling control, the speed control is switched to the settling control when the head reaches before several tracks before the target track. Reaching the several tracks before the target track is detected from the positional errors between the target position and the demodulation position. That is, this detection result is obtained from the demodulation position when the speed is not zero.

If this demodulation position has errors, the track position just before shifting to the settling control changes, so the time required for the settling control changes. Since high speed is now demanded, errors in the time required for the settling control causes a fluctuation in the seek time. Especially when the target speed of the speed control is set higher to increase the speed of the seek time, the head speed at the start of settling control becomes faster, and errors in the demodulation position further increase, which interferes with the increasing speed of the seek time.

Also for the speed control, the target speed is generated from the abovementioned positional errors, so if the demodulation position has errors, the target speed also differs from the predetermined speed, and the seek performance expected in design cannot be obtained.

SUMMARY OF THE INVENTION

It is an object of the present invention to provide a head positioning control method, its device and a disk device for accurately demodulating the position of the head even when the speed of the head is not zero.

It is another object of the present invention to provide a head positioning control method, its device and a disk device for accurately demodulating the position of the head according to the speed of the head.

It is still another object of the present invention to provide a head positioning control method, its device and a disk device for accurately demodulating the position of the head so as to decrease the seek time.

It is still another object of the present invention to provide a head positioning control method, its device and a disk device for removing the errors of the demodulation position which depends on the speed of the head.

To achieve the above objects, a first aspect of the present invention is a head positioning control method for a disk device which comprises a step of demodulating a position signal of the disk read by the head, a step of calculating the demodulation position according to the demodulation result, and a step of calculating the control quantity according to the position errors between the demodulation position and the target position and controlling an actuator which drives the head, wherein the calculation step further comprises a step of correcting the demodulation result with a correction value which depends on the moving speed of the head and obtaining the demodulation position.

A head positioning control device of the present invention comprises a demodulation circuit which demodulates a position signal of the disk read by the head, and a control circuit which calculates a demodulation position according to the demodulation result and controls the actuator for driving the head by calculating the control quantity according to the position errors between the demodulation position and the target position, wherein the control circuit corrects the demodulation result with a correction value which depends on the moving speed of the head and calculates the demodulation position.

The present inventor examined the relationship between a demodulation position and a real position at a certain speed, and discovered that errors depend on the speed of the head, that is, the speed of the actuator. Therefore, an accurate position can be demodulated by correcting the demodulation result with a correction value which depends on the moving speed of the head. Since the correction value depends on the moving speed of the head, an accurate position can be demodulated when the moving speed is zero, just like the prior art, and adding the correction value to the conventional demodulation calculation is easy, which can easily be implemented.

Another mode of the present invention is the head positioning control method wherein the above mentioned demodulation step further comprises a step of demodulating a first position information and a second position information, which have different phases from each other, from the position signal, and the above mentioned calculation step further comprises a step of comparing the first position information and the second position information, a step of correcting the first position information with the first correction value, which depends on the moving speed of the head, according to the above comparison result, and a step of correcting the second position information with the second correction value, which depends on the moving speed of the head, according to the comparison result.

In this mode, when a plurality of position information which have different phases is demodulated, the phase relationships of this position information is also different, so the position information is corrected with a suitable correction value respectively, and the phase relationships are also corrected so as to demodulate the positions more accurately.

Another mode of the present invention is the head positioning control method, wherein the above mentioned demodulation step further comprises a step of demodulating the track number and the offset information from the position signal, and the above mentioned calculation step further comprises a step of selecting the track number as the demodulation position when the moving speed of the head is faster than a predetermined speed, and a step of calculating the demodulation position by correcting the offset information with a correction value which depends on the moving speed of the head when the moving speed of the head is slower than a predetermined speed.

In this mode, the errors of the demodulation position increase as the speed of the head increases, so an accurate correction may be difficult. Therefore if the speed of the head is more than the threshold speed, the demodulation position is obtained only by the track number, without using the above mentioned offset information.

Another mode of the present invention is the head positioning control method, wherein the above mentioned demodulation step further comprises a step of demodulating the track number and the offset information from the position signal, and the above mentioned calculation step further comprises a step of correcting the offset information with the correction value where gain, which depends on the recording position of the offset information, is added to the moving speed of the head with the recording position of the track number as a reference.

In this mode the speed gain is used to obtain the correction value. Since this speed gain depends on the position of the servo pattern where the head crosses, this speed gain is set according to the position of the servo pattern. At this time, the recording position of the offset information is set with the absolute position, that is, the recording position of the track number as a reference, so an accurate speed gain can be set and an accurate demodulation position can be obtained.

DESCRIPTION OF THE PREFERRED EMBODIMENTS

The embodiments of this present invention will now be described in the sequence of position demodulation method, disk device, positioning control system, embodiment and other embodiments.

[Position Demodulation Method]

Figure 1:
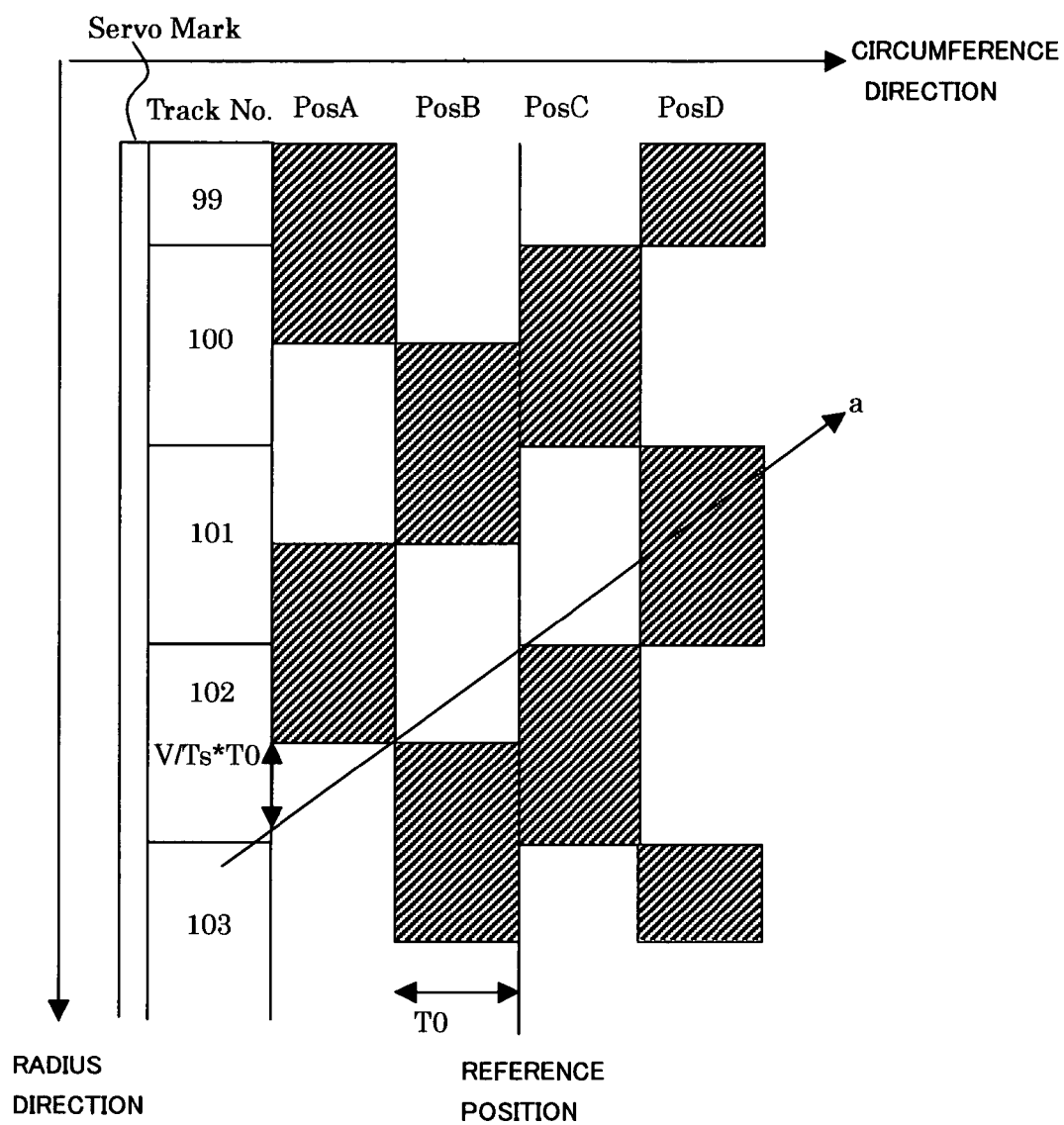
FIG. 1 is a diagram depicting the demodulation position calculation of an embodiment of the present invention.

FIG. 1 is a diagram depicting an embodiment of the position demodulation method of the present invention, and FIG. 2 to FIG. 9 are diagrams depicting the position information PosN and PosQ at each head speed and the simulation results of the demodulation positions after the calculation for describing the position demodulation method of an embodiment of the present invention.

As FIG. 1 shows, the servo pattern recorded on the disk consists of a servo mark, track numbers and four burst servo signals PosA, PosB, PosC and PosD. The servo mark shows the beginning of the servo pattern. The track number (address) indicates the address of the track. The four burst servo signals PosA, PosB, PosC and POSD are patterns recorded in ½ track units, and are used to indicate the offset position from the track center.

Figure 2:
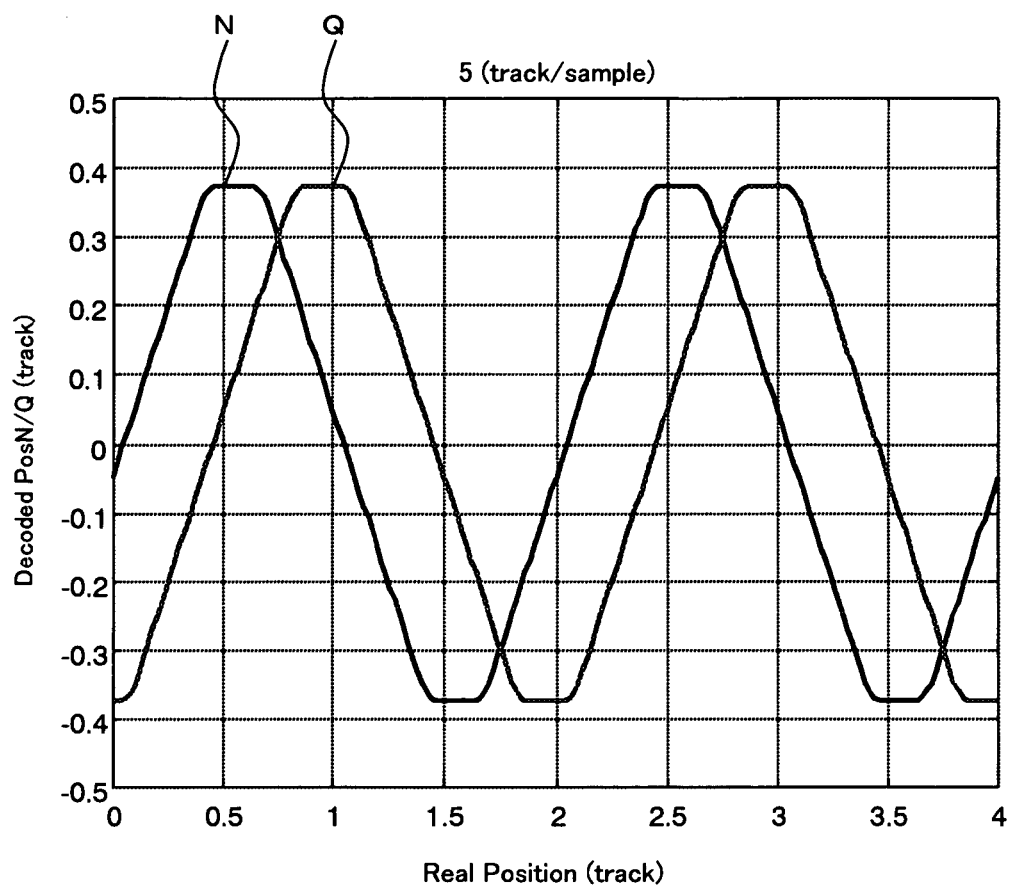
FIG. 2 is a diagram depicting PosN and PosQ when the speed is 5 tracks/sample for describing the demodulation position calculation method of the present invention.
Figure 3:
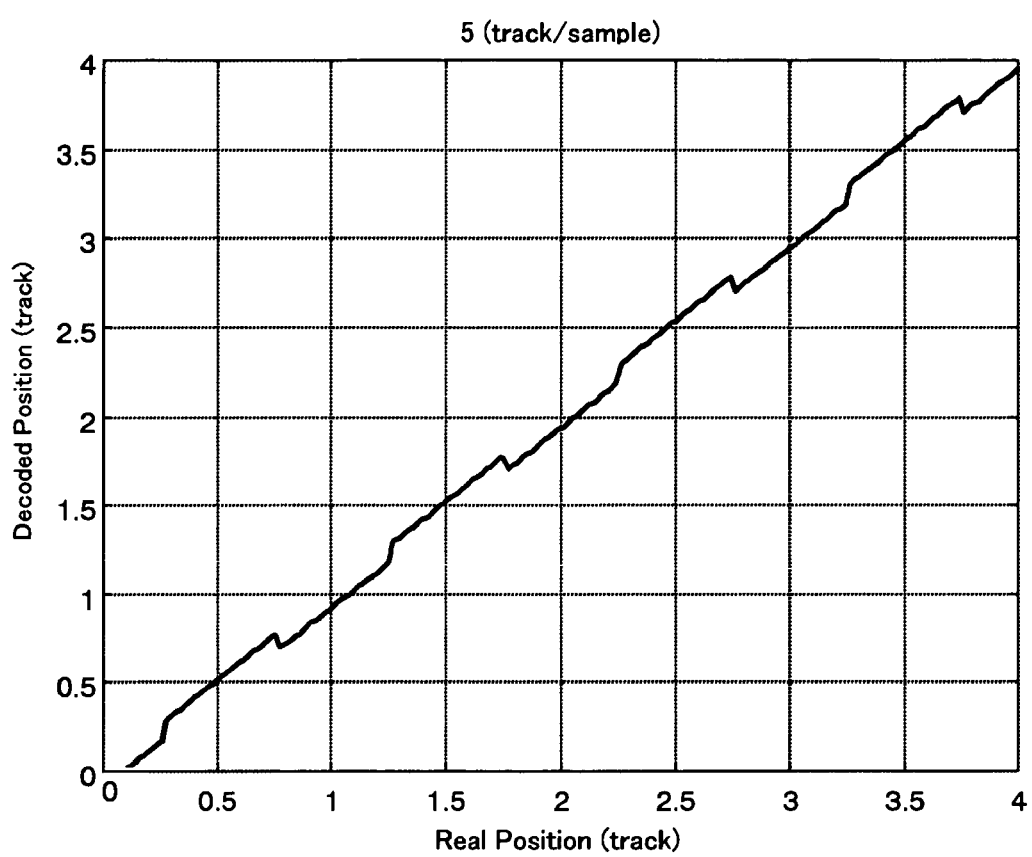
FIG. 3 is a diagram depicting the demodulation position after conventional calculation when the speed is 5 tracks/sample.
Figure 27:
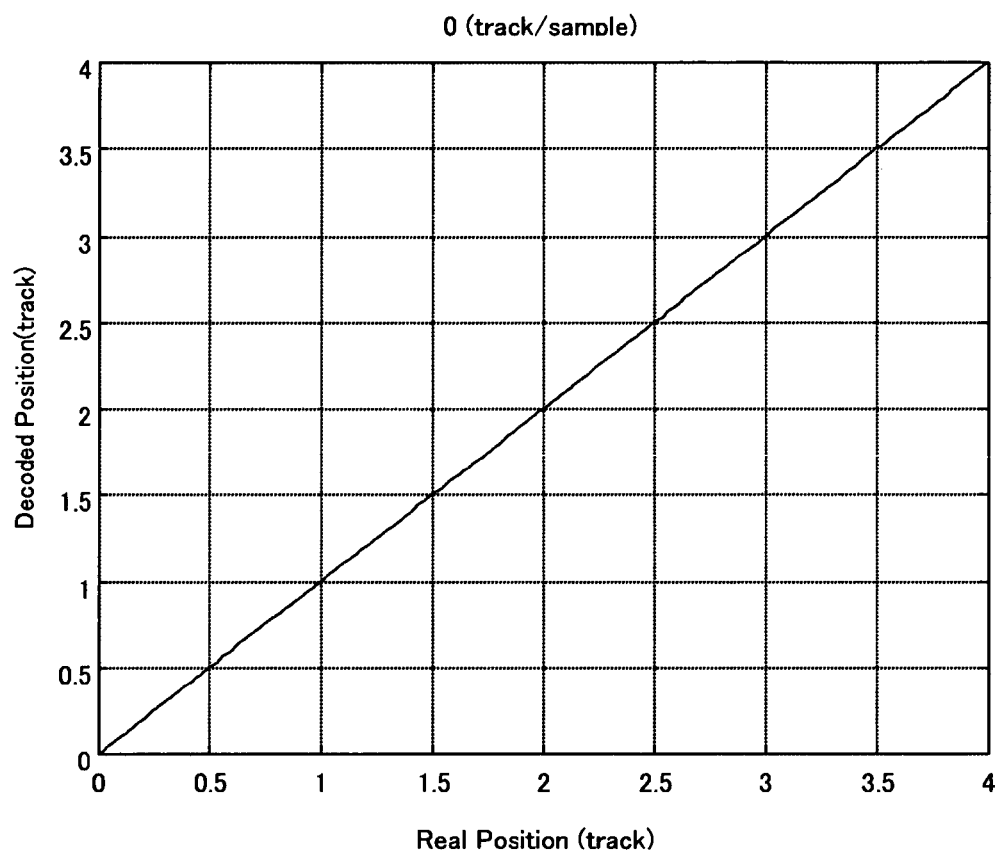
FIG. 27 is a diagram depicting the conventional position demodulation method.

FIG. 1 shows the simulation of the position information and the demodulation positions when the moving speed of the head is not zero and the head crosses the servo pattern diagonally. FIG. 2 shows PosN and PosQ with respect to the real positions when the speed is 5 tracks/sample. FIG. 3 shows the relationship between the demodulation positions calculated by the conventional demodulation position calculation method and the real positions. As FIG. 3 shows, the demodulation positions are shifted from the real positions. FIG. 2 shows that PosN shifted to the right direction of the diagram (in direction where track number is increasing) and PosQ shifted to the left direction of the diagram (in direction where track number is decreasing) from the real positions compared with the case when the speed is zero, shown in FIG. 27.

Figure 4:
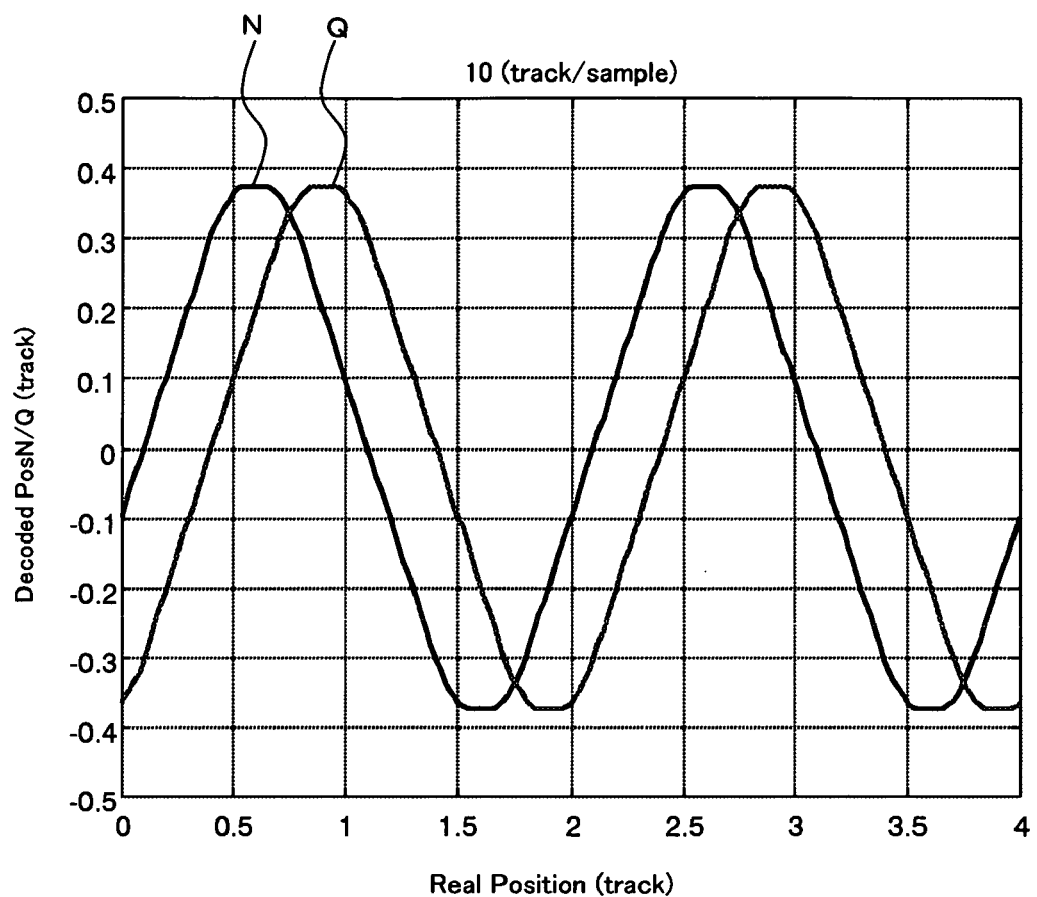
FIG. 4 is a diagram depicting PosN and PosQ when the speed is 10 tracks/sample for describing the demodulation position calculation method of the present invention.
Figure 5:
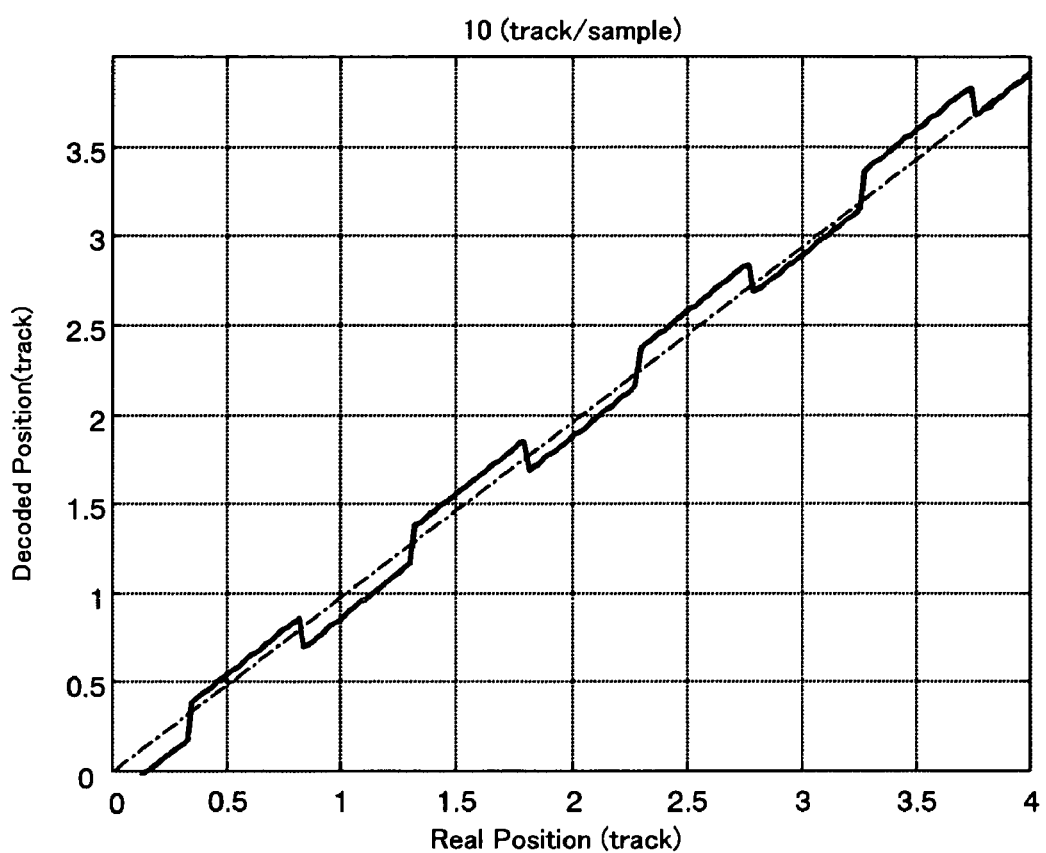
FIG. 5 is a diagram depicting the demodulation position after conventional calculation when the speed is 10 tracks/sample.

FIG. 4 shows PosN and PosQ with respect to the real positions when the speed is 10 tracks/sample. FIG. 5 shows the relationship between the demodulation positions calculated by the conventional demodulation position calculation method and the real positions. As FIG. 5 shows, the demodulation positions shifted further from the real positions. As FIG. 4 shows, POSN is shifted further to the right direction of the diagram (in direction where track number is increasing) and PosQ is shifted further to the left direction of the diagram (in direction where track number is decreasing) from the real positions, compared with the case when the speed is zero, shown in FIG. 27.

Figure 6:
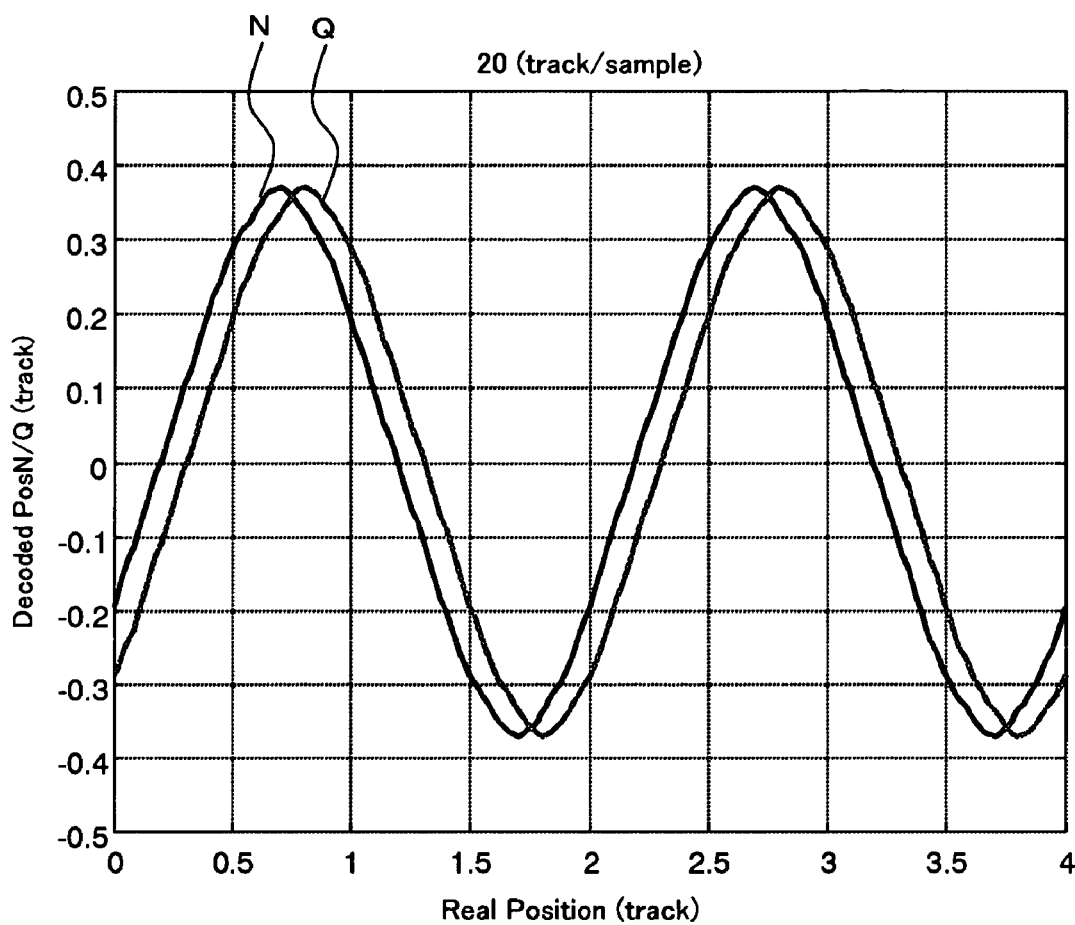
FIG. 6 is a diagram depicting PosN and PosQ when the speed is 20 tracks/sample for describing the demodulation position calculation method of the present invention.
Figure 7:
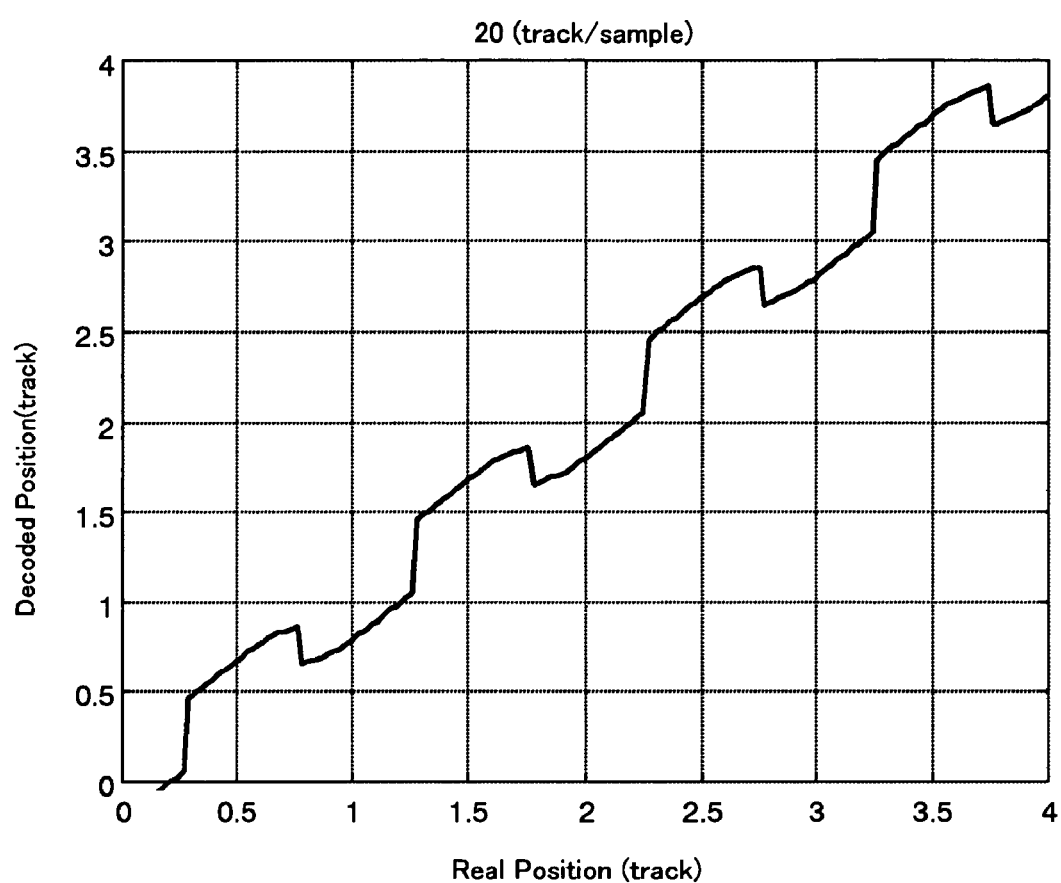
FIG. 7 is a diagram depicting the demodulation position after conventional calculation when the speed is 20 tracks/sample.

FIG. 6 shows PosN and PosQ with respect to the real positions when the speed is 20 tracks/sample. FIG. 7 shows the relationship between the demodulation positions calculated by the conventional demodulation position calculation method and the real positions. As FIG. 7 shows, the demodulation positions have shifted further from the real positions. As FIG. 6 shows, POSN is shifted further to the right direction of the diagram (in direction where track number is increasing) and PosQ is shifted further to the left direction of the diagram compared with the case when the speed is zero, shown in FIG. 27.

Figure 8:
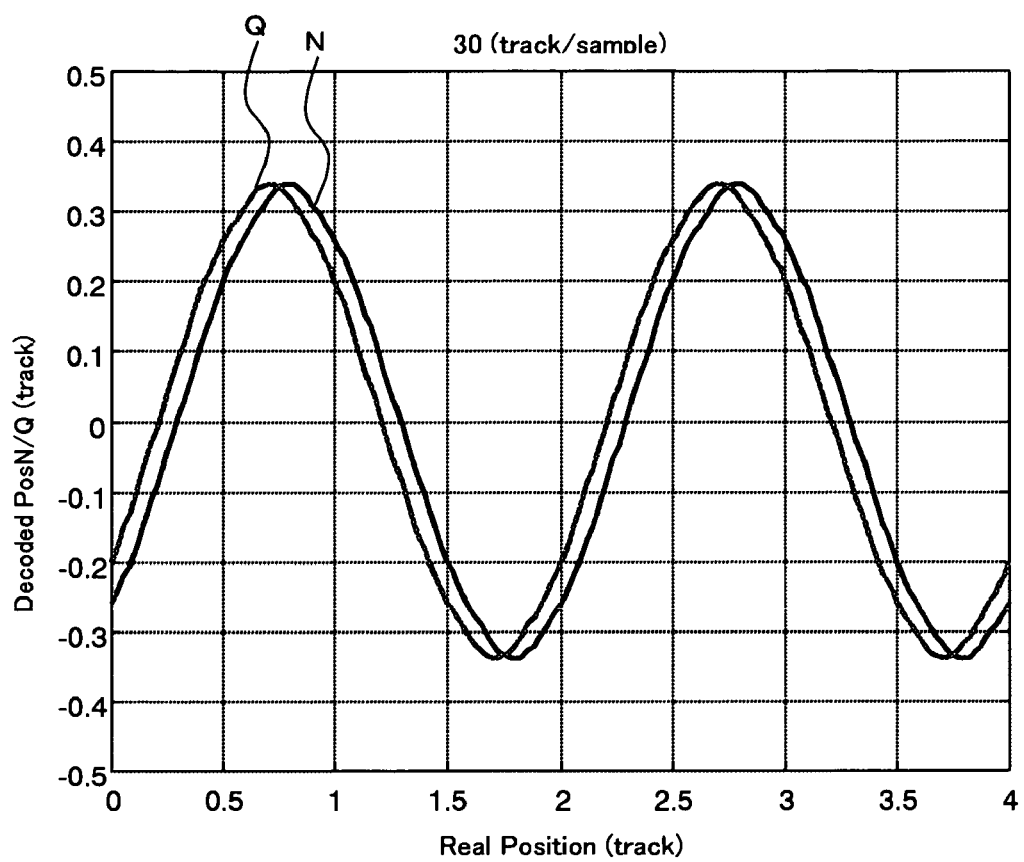
FIG. 8 is a diagram depicting PosN and PosQ when the speed is 30 tracks/sample for describing the demodulation position calculation method of the present invention.
Figure 9:
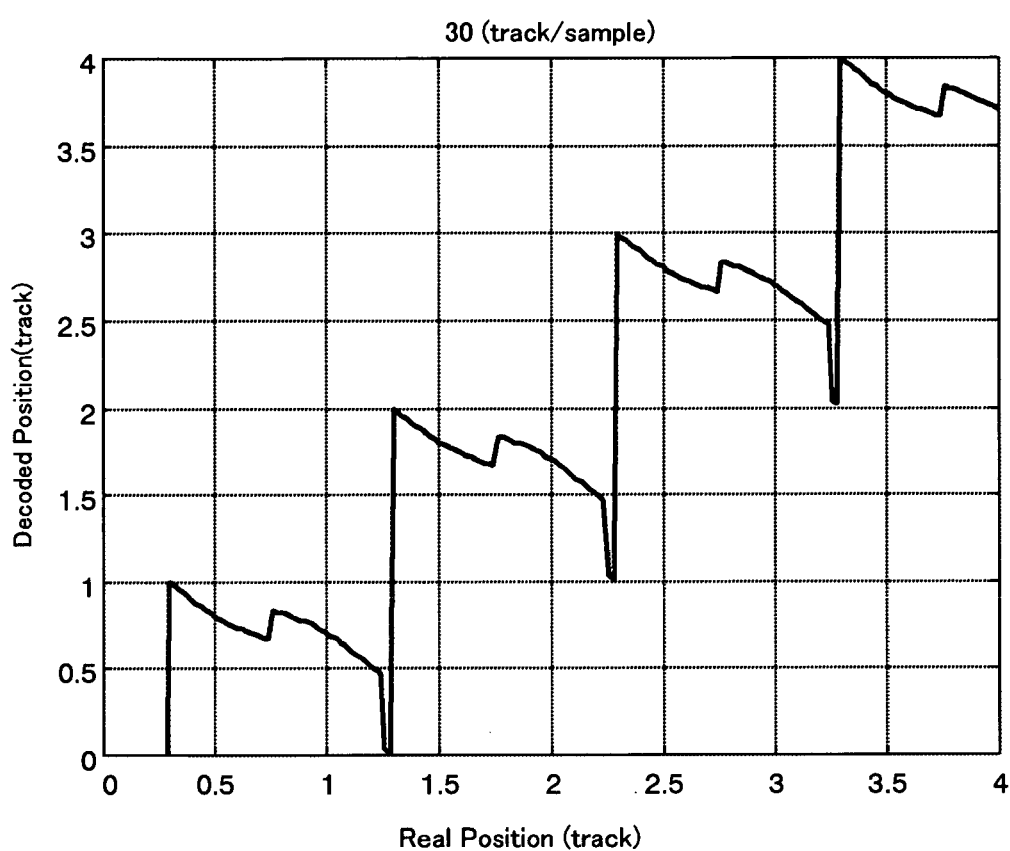
FIG. 9 is a diagram depicting the demodulation position after conventional calculation when the speed is 30 tracks/sample.

FIG. 8 shows PosN and PosQ with respect to the real positions when the speed is 30 tracks/sample. FIG. 9 shows the relationship between the demodulation positions calculated by the conventional demodulation position calculation method and the real positions. As FIG. 8 shows, PosN is shifted further to the right direction of the diagram (in direction where track [number] is increasing) and PosQ is shifted further to the left direction of the diagram from the real positions, and the phases of PosN and PosQ are reversed. Because of this, the demodulation positions hardly indicate the real positions, as shown in FIG. 9.

The above simulation results show the following. The errors of the demodulation positions are in proportion to the moving speed of the head. Also, the phase relationship of PosN and PosQ shifts according to the moving speed of the head. When the moving speed increases even more, the phase relationship of PosN and PosQ reverses, which makes the corresponding relationship between the demodulation positions and the real positions unclear.

This means that correction can be made according to the speed in order to accurately calculate the demodulation positions without changing the servo pattern. As FIG. 1 shows, the head crosses the servo pattern diagonally when the head is moving, and the position deviates in the radius direction. Here it is assumed that the moving speed of the head is 'v', the width of each servo signal PosA–PosD in the circumference direction is 'T0', and the sampling cycle is 'Ts'. When the reference position is at the boundary of PosB and PosC, the positional deviation ΔT in the radius direction at the boundary of PosA and PosB, which is the detection position of POsN, is given by the following formula.

$$\Delta T=(v/Ts)*T0 \qquad (6)$$

When the reference position is at the boundary position between PosB and PosC, the detection position of PosQ is the boundary position between PosC and PosD, so –ΔT is corrected for PosQ since PosN and PosQ are in symmetric positions. In other words, a speed correction term is added to the above formulas (3) and (5). Therefore the demodulation calculation formula becomes as follows. When abs (PosN)≦abs (PosQ), the demodulation position is obtained by the following formula (7).

$$\text{Position}=-\text{sgn (PosQ)} *\text{PosN} +\text{Track}+\Delta T \qquad (7)$$

If sgn (PosQ)*even (Track)>0.0, however, the following formula (4) is added to the formula (7).

$$\text{Position}+=\text{sgn (PosQ)}*\text{sgn (PosN)}*1.0 \qquad (4)$$

If abs (PosN) is not≦abs (PosQ), the following formula (8) is used.

$$\text{Position}=\text{sgn (PosN)}*(\text{PosQ}+\text{even (Track)}*0.5))+\text{Track}-\Delta T \qquad (8)$$

This is written as follows in the C language program.
if (abs (PosN)≦abs (PosQ)){
Position=–sgn (PosQ)*PosN+Track+ΔT;
if (sgn (PosQ)*even (Track)>0.0)
Position+=sgn (PosQ)*sgn (PosN)*1.0;
} else {
Position=sgn (PosN)*(PosQ+even (Track)*0.5)+Track–ΔT;
}

For example, when a 3.5 inch disk rotates at 5400 rpm and has a 11800 TPI (track density), then the pattern width T0 is 1.8 μs. When the sampling cycle Ts is 185 μs, ΔT is given by the following formula.

$$\Delta T=(v/185e-6)*1.8e-6=0.0097*v \qquad (9)$$

As FIG. 8 and FIG. 9 show, the appropriate demodulation positions may not be obtained even if the above mentioned speed correction is executed in a range where the phases of PosN and PosQ are reversed. Therefore at a speed where the phase relationship of PosN and PosQ is reversed, PosN and PosQ are not used for the calculation of the demodulation position. In other words, only the track number is used as the following formula (10) shows.

$$\text{Position}=\text{Track} \qquad (10)$$

The threshold speed Vt is determined. When the reference position is at the boundary of PosB and PosC, the phases of PosN and PosQ are reversed if the offset (positional deviation) ΔT by speed is 0.25 tracks, since the phases of PosN and PosQ shifted a 0.25 track. In other words, [ΔT] is determined using the formula (6) as $$(Vt/Ts)*T0=0.25 \qquad (11)$$

If the above conditions exist, that is, pattern width T0 is 1.8μs and the sampling cycle Ts is 185μs, then the threshold speed Vt becomes as follows.

$$Vt=0.25\ Ts/T0=0.25*185/1.8=25.7 \qquad \text{(track/sample)}$$

When the speed is fast, position detection errors are generated. Therefore the speed calculated from the position also includes errors. So it is preferable to set the actual threshold speed to less than the above mentioned theoretical threshold speed value.

[Disk Device]

Figure 10:
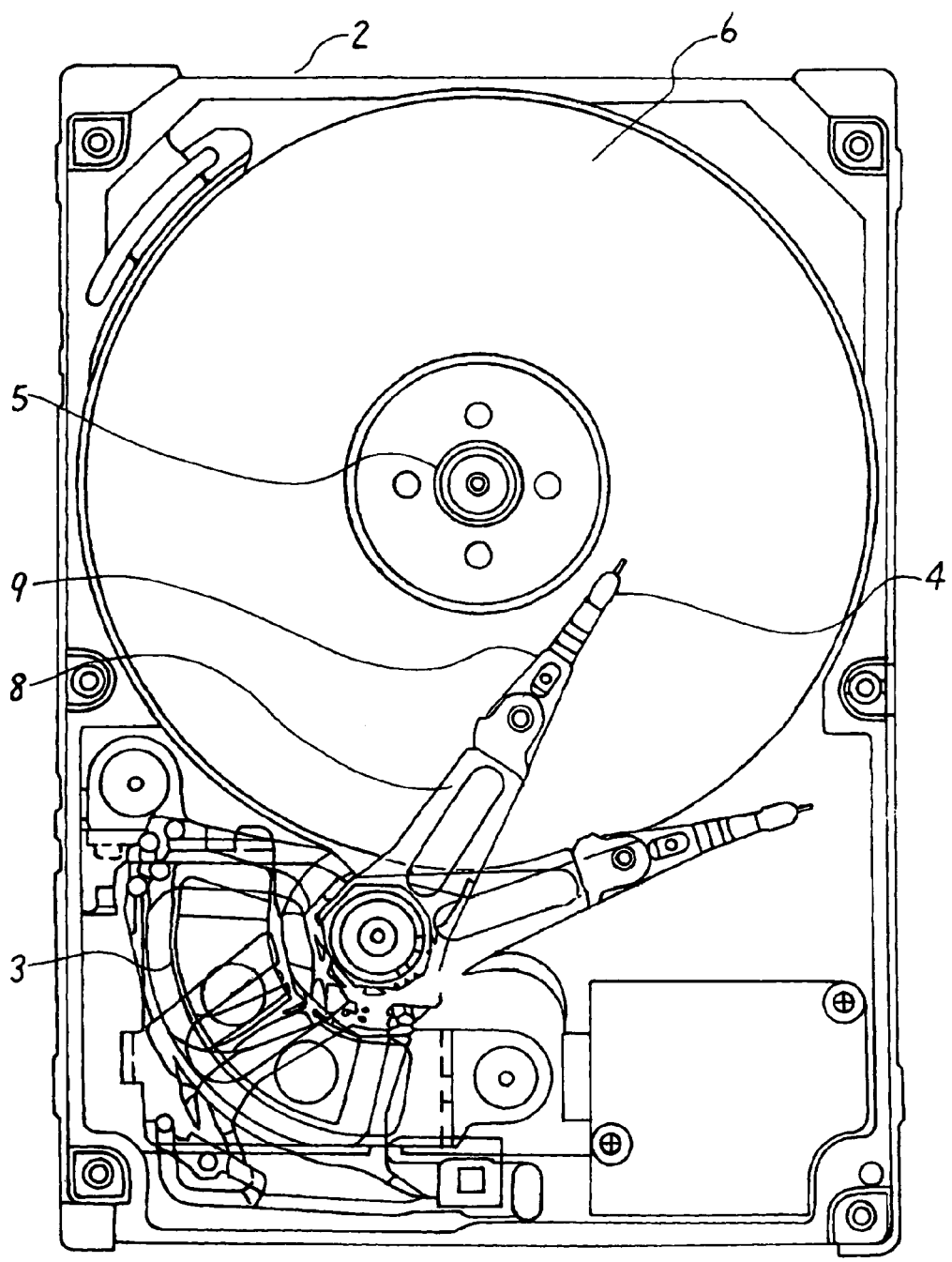
FIG. 10 is a top view depicting a disk unit of an embodiment of the present invention.
Figure 11:
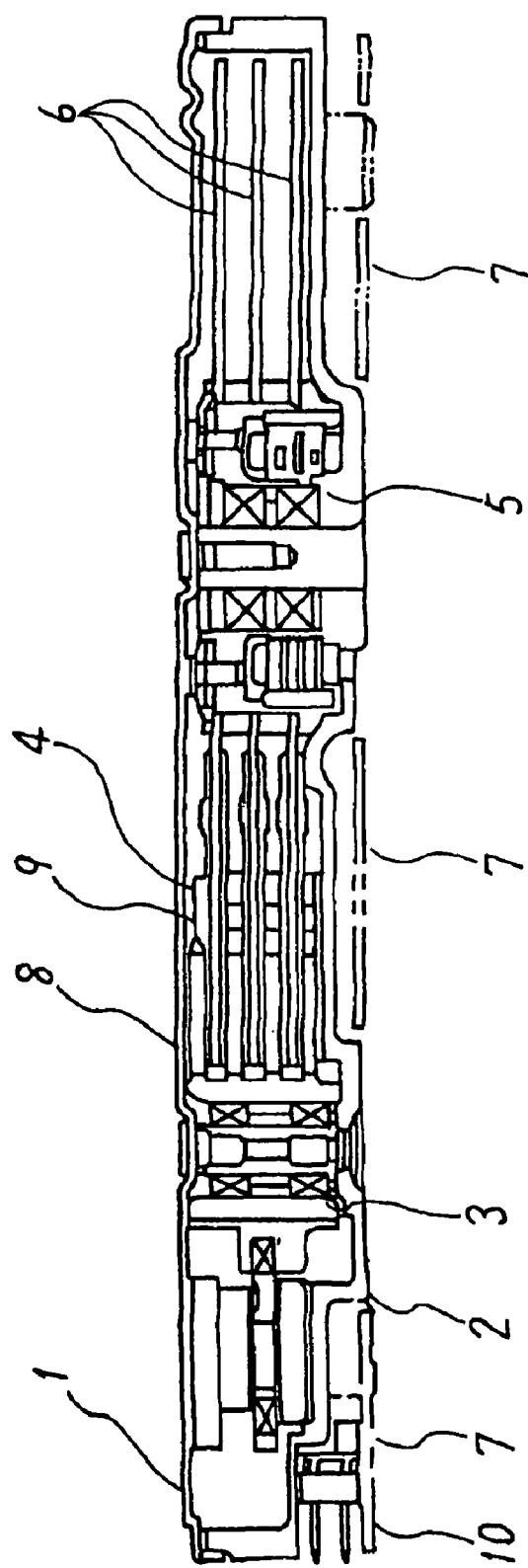
FIG. 11 is a cross-sectional view depicting the disk unit in FIG. 10.

FIG. 10 is a top view of a disk device of an embodiment of the present invention, and FIG. 11 is a cross-sectional view of a disk device thereof. A hard disk is used in this example as the disk device.

As FIG. 10 and FIG. 11 show, the magnetic disk 6 is comprised of a substrate (disk) and a magnetic recording layer thereon. The magnetic disk 6 has a 3.5 inch size, and there are three magnetic disks 6 mounted in the drive. The spindle motor 5 supports and rotates the magnetic disk 6. The magnetic head 4 is disposed at the actuator. The actuator is comprised of a rotation type VCM (voice coil motor) 3, an arm 8, and a flexure (suspension) 9. The magnetic head 4 is installed at the tip of the flexure 9.

The magnetic head 4 reads data on the magnetic disk 6 and writes data. The magnetic head 4 is comprised of an MR element (reproducing device) and a write element. The actuator 3 positions the magnetic head 4 at a desired track of the magnetic disk 6. The actuator 3 and the spindle motor 5 are installed on the drive base 2. The cover 1 covers the drive base 2 so as to isolate the inside of the drive from the outside. The printed circuit board 7 where the control circuit of the drive is mounted is under the drive base 2. The connector 10 is under the drive base 2 for connecting the control circuit and the outside.

Figure 12:
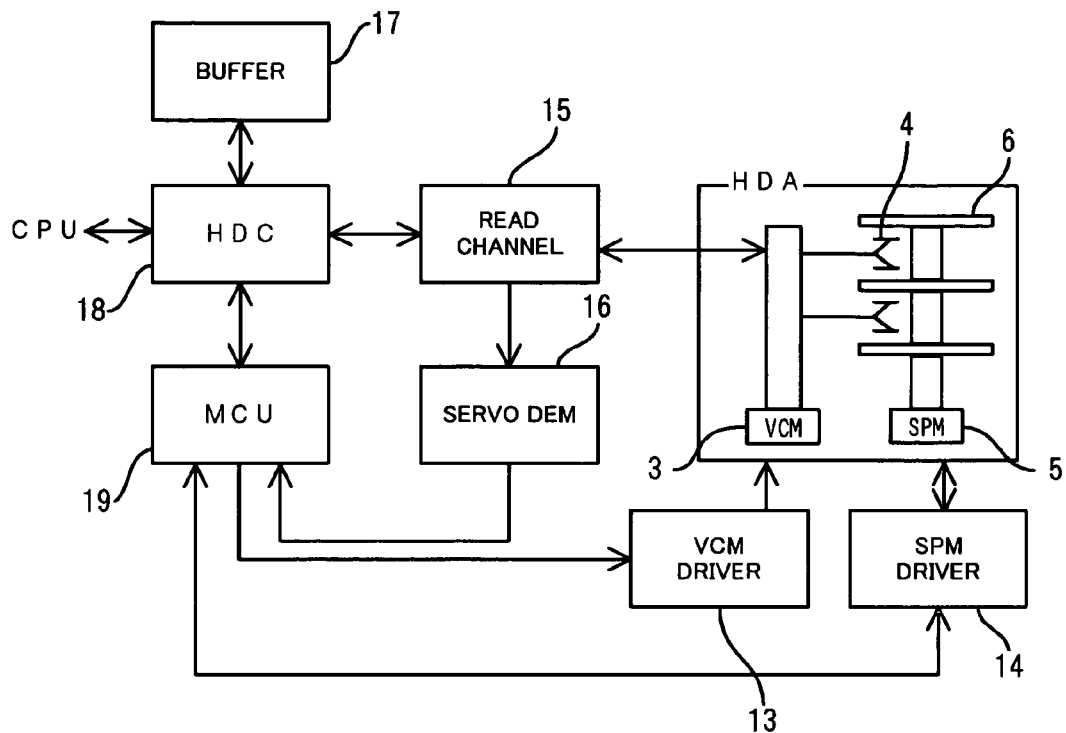
FIG. 12 is a block diagram depicting the disk unit in FIG. 10.

FIG. 12 is a block diagram of the control circuit on the printed circuit board 7 inside the drive. The HDC (hard disk controller) 18 receives various commands from the host CPU, controls the interface with the host CPU, such as exchanging data, and generates control signals inside the magnetic disk unit for controlling the recording/reproducing format on the magnetic disk medium. The buffer 17 is used for temporarily storing write data from the host CPU, and for temporarily storing read data from the magnetic disk medium.

The MCU (micro-controller) 19 comprises a microprocessor (MPU), a memory, a DA converter, and an AD converter. The MCU (hereafter MPU) 19 performs servo control (positioning control) for positioning the magnetic head and for other processing. The MPU 19 executes programs stored in memory, recognizes position signals from the servo demodulation circuit 16, and calculates the control value of the VCM control current of the actuator 3 for positioning. Also the MPU 19 controls the drive current of the SPM drive circuit 14.

The VCM drive circuit 13 is comprised of a power amplifier to supply drive current to the VCM (voice coil motor) 3. The SPM drive circuit 14 is comprised of a power amplifier to supply drive current to the spindle motor (SPM) 5 to rotate the magnetic disk.

The read channel 15 is a circuit for executing recording and reproducing. The read channel 15 is comprised of a modulation circuit for recording write data from the host CPU to the magnetic disk medium 6, a parallel-serial conversion circuit, a demodulation circuit for reproducing data from the magnetic disk medium 6, and a serial-parallel conversion circuit. As described later with reference to FIG. 14, the servo demodulation circuit 16 is a circuit for demodulating the servo pattern (described later with reference to FIG. 17) recorded on the magnetic disk medium 6, and outputs the position signals to the MPU 19.

Although the head IC is not illustrated, a head IC where a write amplifier to supply recording current to the magnetic head 4 and a preamplifier for amplifying reproducing voltage from the magnetic head 4 are built-in and disposed inside the drive HDA.

Here the magnetic disk device is used as an example to describe the disk device, but such optical disk units as DVD and MO may be used, and although a read/write possible unit is used here, a read only unit (reproducing unit) may be used.

[Positioning Control System]

The positioning control system where the MPU 19 executes positioning will now be described.

Figure 13:
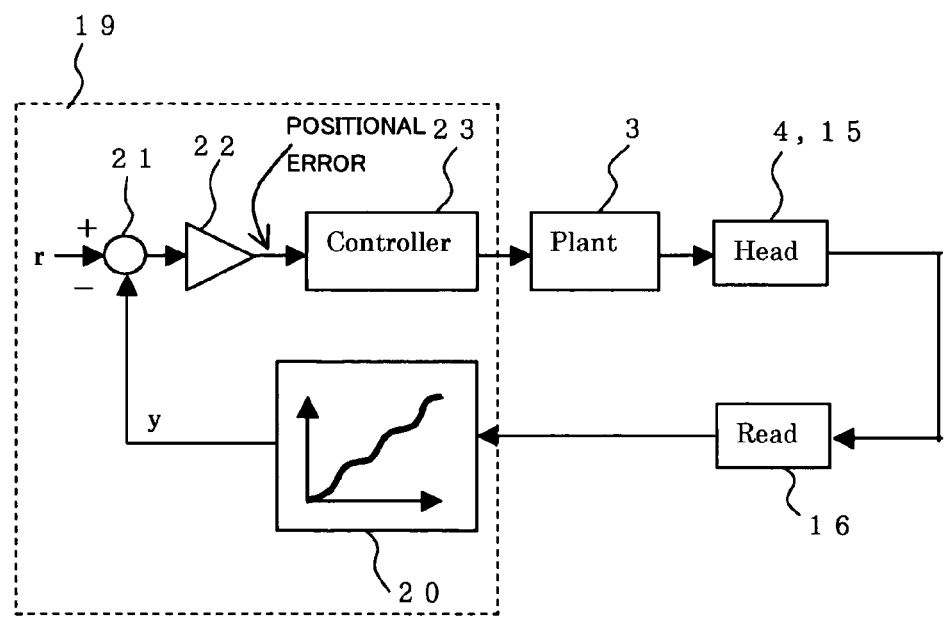
FIG. 13 is a block diagram depicting the positional control of an embodiment of the present invention.
Figure 14:
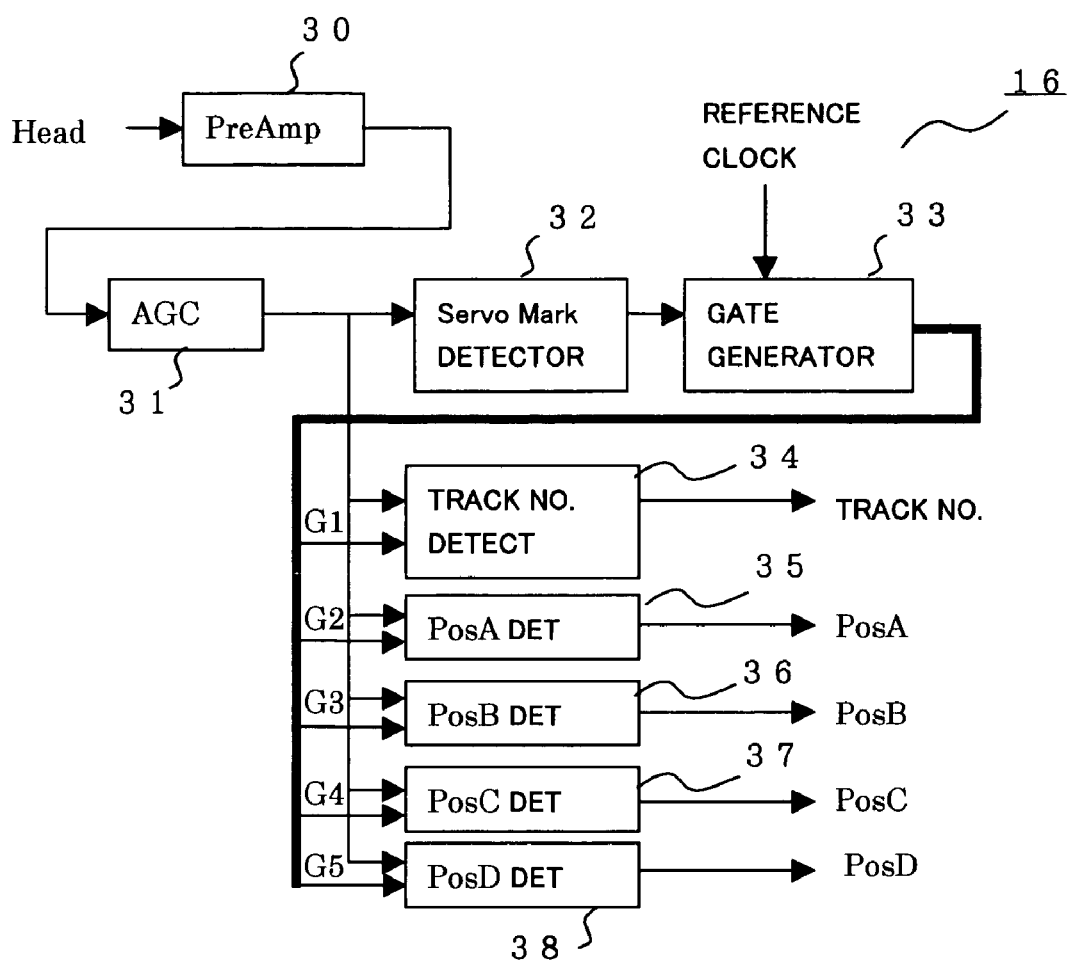
FIG. 14 is a block diagram depicting the servo demodulation circuit in FIG. 13.
Figure 15:
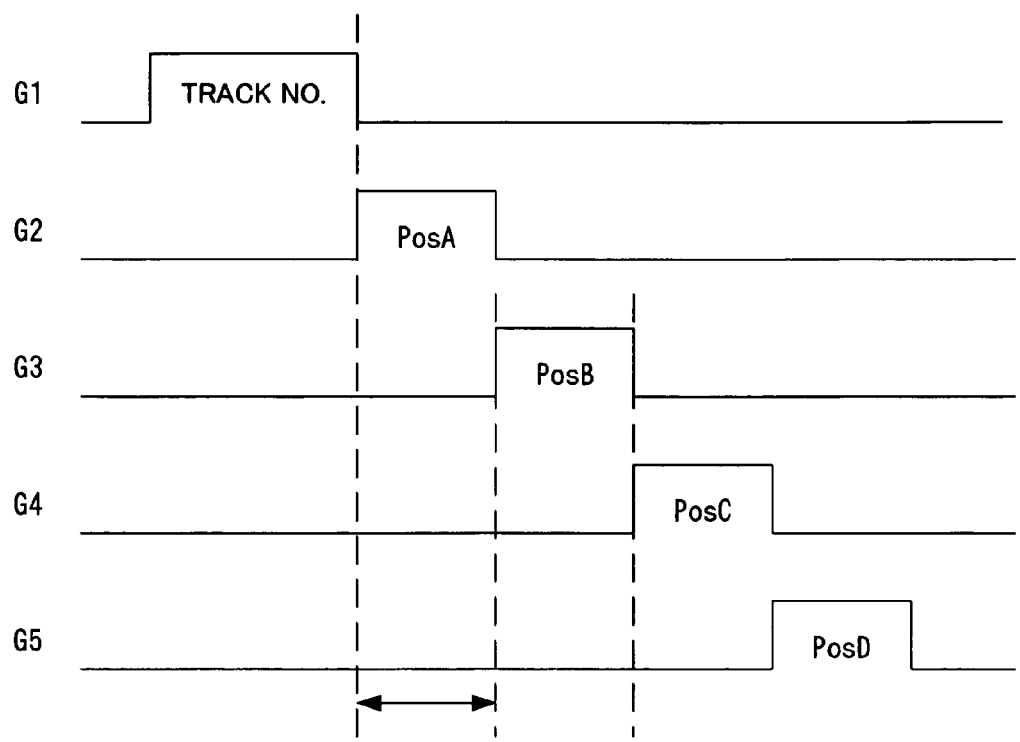
FIG. 15 is a time chart of the servo demodulation circuit in FIG. 14.
Figure 16:
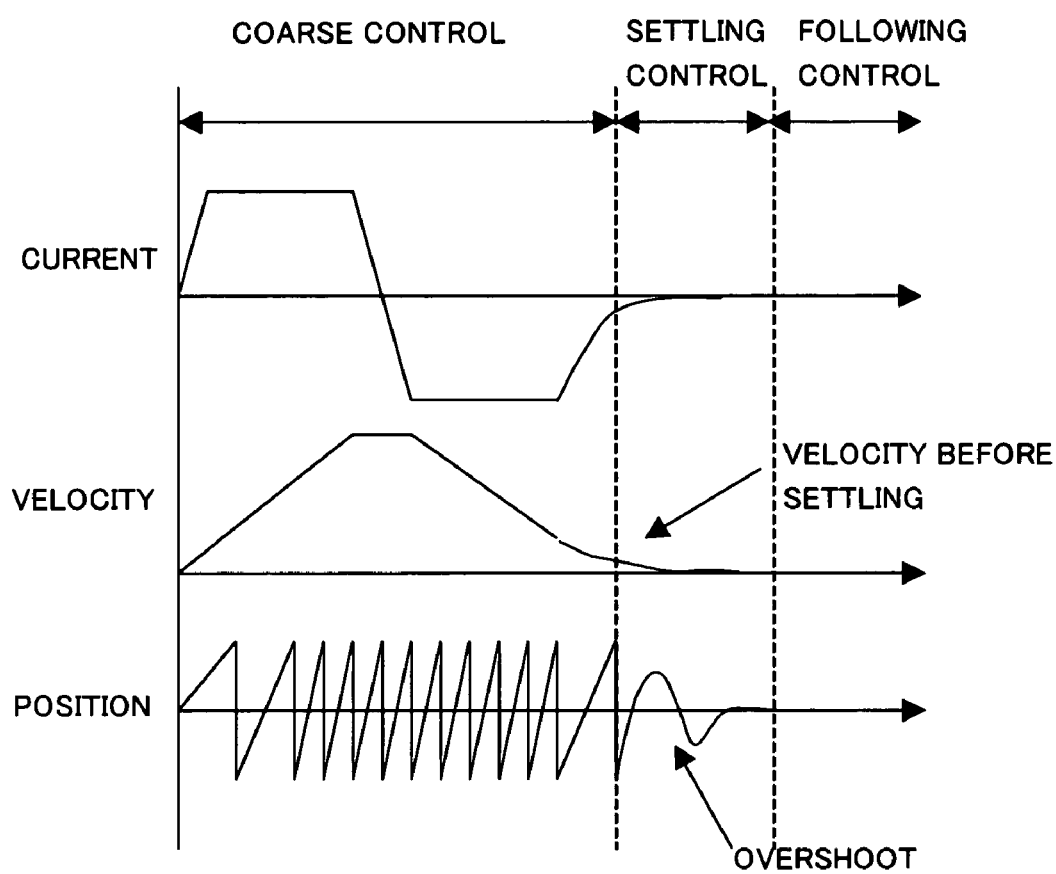
FIG. 16 is a diagram depicting the operation of the controller in FIG. 14.
Figure 17:
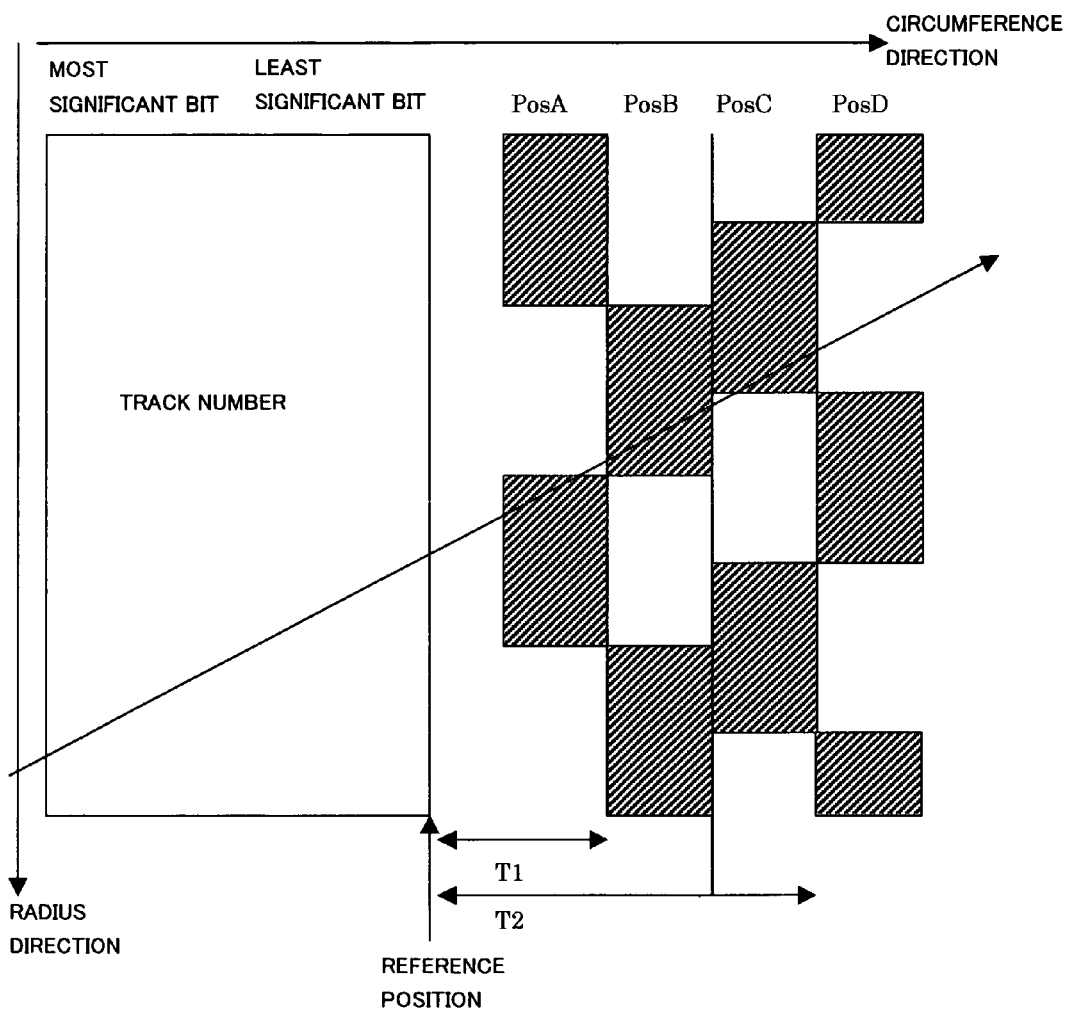
FIG. 17 is a diagram depicting the relationship between a servo pattern and a reference position.
Figure 18:
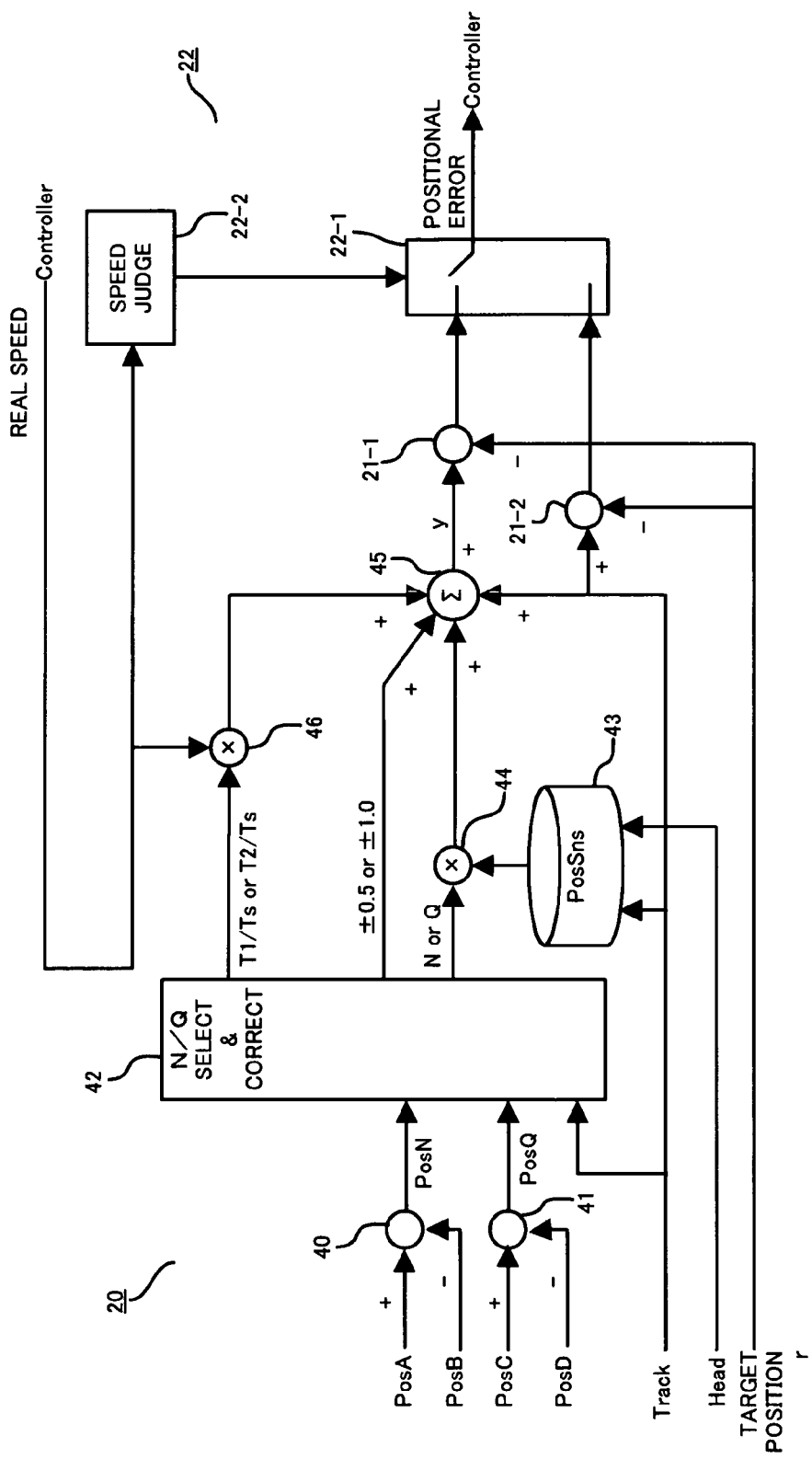
FIG. 18 is a functional block diagram depicting the position demodulation part in FIG. 14.
Figure 19:
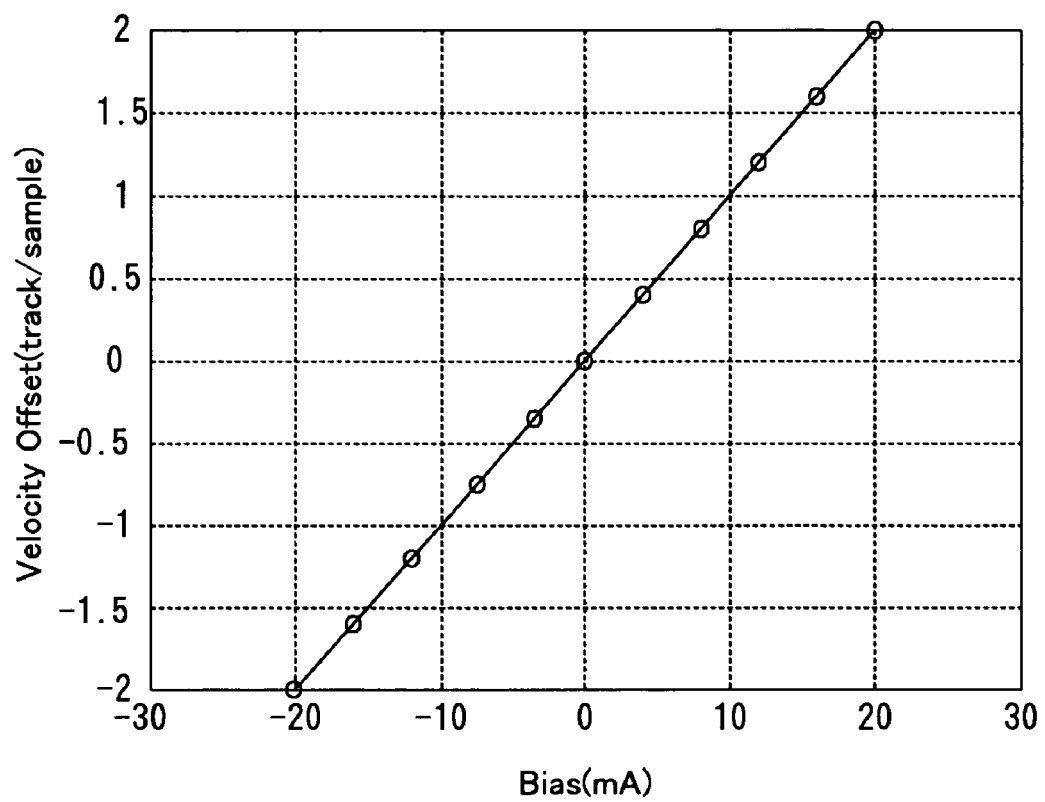
FIG. 19 is a diagram depicting the relationship between the bias value and the speed offset for describing the threshold speed according to the present invention.

FIG. 13 is a block diagram of the positioning control system, FIG. 14 is a block diagram of the servo demodulation circuit in FIG. 12, FIG. 15 is a time chart of the circuit in FIG. 14, FIG. 16 is a diagram depicting the servo control in FIG. 13, FIG. 17 is a diagram depicting the demodulation position calculation method, FIG. 18 is a functional block diagram of the position demodulation part in FIG. 13, and FIG. 19 is a diagram depicting the threshold speed.

As FIG. 13 shows, the positioning control system is comprised of the MPU 19, the VCM 3, the magnetic head 15 and the servo demodulation circuit 16. The MR head of the magnetic head 15 reads the servo pattern of the magnetic disk 6. A servo pattern is written in each sector of the magnetic disk 6 by the sector servo system.

This servo pattern consists of a servo mark, track numbers and four burst servo signals PosA, PosB, PosC and PosD as shown in FIG. 1 and FIG. 17. The servo mark indicates the beginning of the servo pattern. The track number indicates the address of the track. The four burst servo signals PosA, PosB, PosC and PosD are patterns recorded in ½ track units, and are used to indicate the offset position from the track center.

The servo demodulation circuit 16 in FIG. 13 will now be described with reference to FIG. 14 and FIG. 15. The preamplifier 30 amplifies the read signal of the MR head 15. The AGC(automatic gain control) circuit 31 adjusts the gain of the read signal and controls the amplitude of the read signal to a predetermined [level]. The servo mark detection circuit 32 detects the servo mark shown in FIG. 1 from the read signal.

The gate signal generation circuit 33 generates the gate signals G1, G2, G3, G4 and G5 (see FIG. 15) of each detector 34–38 synchronizing with the clock and responding to the detection of the servo mark. The track number detector 34 detects the track numbers shown in FIG. 1 and FIG. 17 responding to the gate signal G1, and outputs the track number. The PosA detector 35 detects the burst servo signal PosA shown in FIG. 17 responding to the gate signal G2, and outputs the amplitude thereof as PosA.

The PosB detector 36 detects the burst servo signal PosB shown in FIG. 17 responding to the gate signal G3, and outputs the amplitude thereof as PosB. The PosC detector 37 detects the burst servo signal PosC shown in FIG. 17 responding to the gate signal G4, and outputs the amplitude thereof as PosC. The PosD detector 38 detects the burst servo signal PosD shown in FIG. 17 responding to the gate signal G5, and outputs the amplitude thereof as PosD.

The MPU 19 is comprised of a position demodulation part 20, an error computing unit 21, a gain correction part 22 and a controller 23, as shown in FIG. 13. Each of these parts are the functional blocks of the MPU 19. The controller 23 is a known servo controller which calculates the control quantity according to the position errors. The servo controller 23 executes coarse control, settling control and follow control according to the position errors, as shown in FIG. 16.

The coarse control controls the speed to the target position. The coarse control is comprised of a speed control, PD control, or observer control which does not include steady state bias estimation. As shown in FIG. 16, the coarse control switches the control mode from acceleration and constant speed to deceleration. This acceleration mode is a control to supply current and to increase speed. The constant speed mode is a control to set the current to "0", and to maintain constant speed. The deceleration mode is a control to supply current in a direction opposite that of acceleration time, and to decrease the speed so as to be close to zero near the target position. Constant speed mode is not included when the distance is short.

The follow control is a control for the magnetic head to follow to the target position. The follow control is comprised of PID control, PixLeadLag, or observer control which includes steady state bias estimation. The settling control is a control mode to control transition from the coarse control mode and the follow control mode. In settling control, an integration element is included in the control system.

The position demodulation part 20 in FIG. 13 calculates the demodulation position (Position) from the track number, and PosA, PosB, PosC and PosD received from the servo demodulation circuit 16. In other words, PosN and PosQ are calculated from PosA, PosB, PosC and PosD, as mentioned above.

$$PosN = PosA - PosB \tag{1}$$

$$PosQ = PosC - PosD \tag{2}$$

or $$PosN = PosA - PosC \tag{12}$$

$$PosQ = PosB - PosD \tag{13}$$

Then the actual speed 'v' and the threshold speed 'Vt' of the head are compared. When Vt>v, that is, when the actual speed 'v' is less than the threshold speed Vt, the modulation position is calculated based on the formula (7) and (8), as mentioned above.

In the above description on FIG. 1, the boundary of PosB and PosC was used as a reference position. However as FIG. 17 shows, a shift is generated between the track numbers and the detection times of the burst servo signals PosA, PosB, PosC and PosD. Therefore in order to correct speed more accurately, it is preferable to use an absolute position as the reference position. So in FIG. 17, the reference position is the least significant bit position of the track numbers. Here track numbers are arranged in the sequence of most significant bit to least significant bit. Also here time from the least significant bit to the boundary of PosA and PosB is T1, and time from least significant bit to the boundary of PosC and PosD is T2.

At this time, the speed correction value $\Delta T1$ of PosN and the speed correction value $\Delta T2$ of PosQ are given by the following formulas.

$$\Delta T1 = (v*T1)/Ts \tag{14}$$

$$\Delta T2 = (v*T2)/Ts \tag{15}$$

Therefore the modulation position is calculated by the following formula (16) and formula (17), modifying the formula (7) and formula (8) respectively. In other words, the modulation position is obtained by the following formula (16) when abs (PosN)≦abs (PosQ).

$$\text{Position} = -\text{sgn (PosQ)} * \text{PosN} + \text{Track} + \Delta T1 \tag{16}$$

When sgn ((PosQ)*even (Track)>0.0, however, the following formula (4) is added to the formula (16).

$$\text{Position} += \text{sgn (PosQ)} * \text{sgn (PosN)} * 1.0 \tag{4}$$

When abs (POSN) is not≦abs (PosQ), conversely, the following formula (17) is used.

$$\text{Position} = \text{sgn (PosN)} * (\text{PosQ} + \text{even (Track)} * 0.5) + \text{Track} + \Delta T2 \tag{17}$$

This is written as follows in the C language program
if (abs (v)<Vt){
if (abs (PosN)≦abs (PosQ)){
Position=−sgn (PosQ)*PosN+Track+ΔT1;
if (sgn (PosQ)*even (Track)>0.0)
Position+=sgn (PosQ)*sgn (PosN)*1.0;
} else {
Position=sgn (PosN)*(PosQ+even (Track)*0.5)+Track+ΔT2;
}
} else {
Position=Track
}

For the actual speed of the head and the actuator, the speed calculated by the servo controller 23 in FIG. 13 is used. For example, when the servo controller 23 is comprised of the observer, the estimated speed of the observer is used.

The demodulation part will now be described with reference to a functional block diagram. FIG. 18 is a block diagram depicting the details on a position demodulation part 20, an error computing unit 21 and a gain correction part 22 of the MPU 19. The position demodulation part 20 further comprises a PosN computing unit 40, a PosQ computer unit 41, an N/Q selection and correction part 42, a PosSns table 43, multipliers 44 and 46, and an adder 45.

The PosN computing unit 40 calculates the PosN signal by subtracting PosB from PosA. The PosQ computing unit 41 calculates the PosQ signal by subtracting PosD from PosC. The N/Q selection and correction part 42 is disposed to obtain the offset position using the linear parts of PosN and PosQ.

The selection and correction part 42 compares the absolute values abs (PosQ) and abs (PosN) of PosQ and PosN. If abs (PosQ)≧abs (PosN), then PosN is selected. If not, PosQ is selected. In other words, the selection and correction part 42 outputs N=−sgn (PosQ)*PosN if abs (PosQ)≧abs (PosN), and outputs Q=sgn (POSN)*PosQ if not. "sgn" refers to the sign.

The selection and correction part 42 judges whether the track number Track is an odd or even track, and if the track number is an odd track, the even (Track) is set to "−1", and if the track number is an even track, the even (Track) is set to "+1". When PosN is selected, the selection and correction part 42 outputs sng (PosQ)*sgn (PosN)*1.0 if [sgn (PosQ) *even (Track)]>0.0. This value is ±1.0. Otherwise, the selection and correction part 42 outputs "0". When PosQ is selected, the selection and correction part 42 outputs even (Track)*0.5. When PosN is selected, the selection and correction part 42 outputs the speed correction gain T1/Ts, and when PosQ is selected, the selection and correction part 42 outputs the speed correction gain T2/Ts.

The PosSns table 43 stores the sensitivity gain to eliminate the step difference at switching, so as to use PosN and PosQ alternately in ½ track units. This sensitivity gain is set for each track and head. The sensitivity gain is set such that the demodulation position (detected position) with respect to the real position continues even if PosN and PosQ are alternately used.

The multiplier 44 multiplies the output N or Q of the selection and correction part 42 by the sensitivity gain PosSnsTable (Head, Track) of the PosSns table 43. The multiplier 46 multiplies the speed correction gain by the actual speed from the controller 23 to calculate the speed correction value. The adder 45 adds the track number, the output of the multiplier 44, "0", "±0.5" or "±1.0" of the selection and correction part 42, and the speed correction value of the multiplier 46 to calculate the modulation position y.

Therefore, the modulation position y obtained from PosN and PosQ is the above mentioned position described by the C language program.

The error computing unit 21 further comprises a first computing unit 21-1 which subtracts the target position 'r' from the demodulation position 'y' and outputs the position errors, and a second computing unit 21-2 which subtracts the target position from the track position and outputs the position errors.

The gain correction part 22 further comprises a speed decision unit 22-2 which compares the actual speed and the above mentioned threshold speed, and decides the speed. The switching unit 22-1 selects the position errors to be output to the controller 23 from the position errors of the first computing unit 21-1 and the position errors of the second computing unit 21-2, and outputs the selected position errors to the controller 23.

This threshold speed will be described with reference to FIG. 19. As mentioned above, the theoretical value of the threshold speed is determined by the above mentioned formula (11) when two-phase position information where phases have shifted 90 is used. For example, the threshold speed Vt is 25.7 (track/sample) under the above mentioned conditions, that is, the pattern width T0 is 1.8 μs and the sampling cycle Ts is 185 μs.

When speed is fast, however, position detection errors are involved. Therefore the speed calculated from the position also has errors. As the diagram in FIG. 19, depicting the relationship between the bias value applied to the actuator and the speed offset, shows, the speed offset (errors of detected speed) changes by the fluctuation of the bias value. So it is preferable to set the actual threshold speed to be less than the above mentioned theoretical threshold speed value considering the detection errors. By correcting the speed in this way, the demodulation position can be accurately demodulated even when the head is moving. Also speed correction can be easily added to the conventional demodulation calculation.

[Embodiment]

Figure 20:
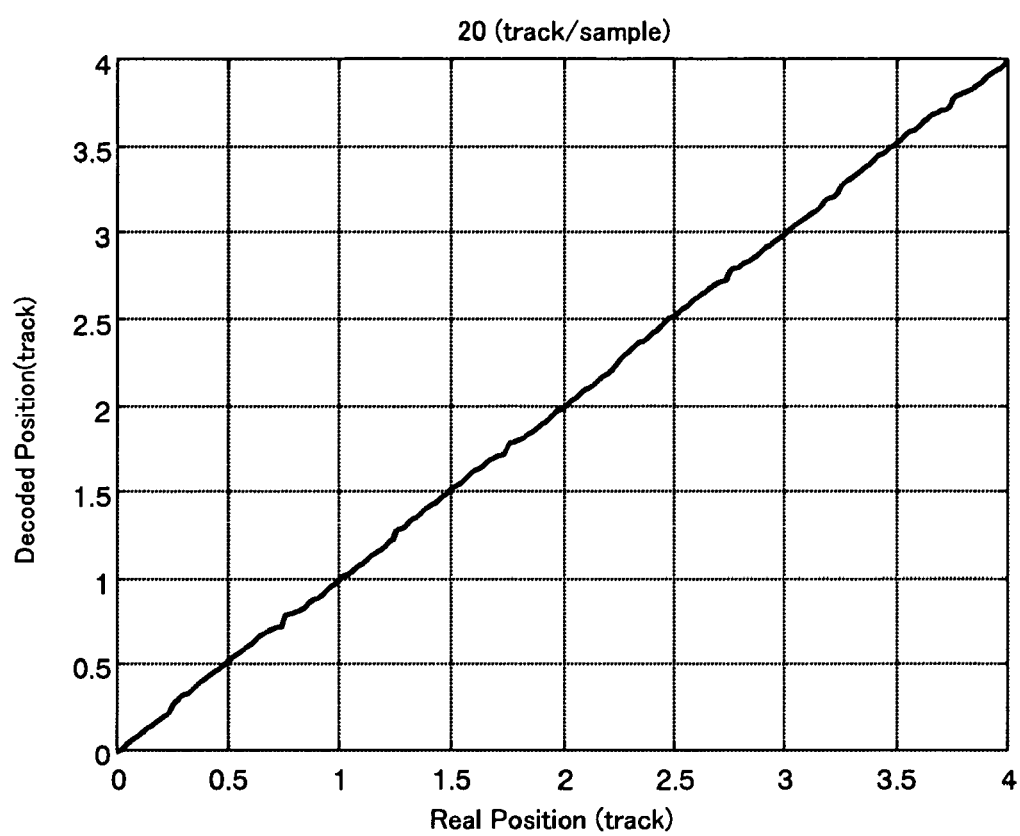
FIG. 20 is a diagram depicting the effect when the speed correction of the present invention is executed.

FIG. 20 is a diagram depicting an embodiment of the present invention. In the 3.5 inch magnetic disk drive, rotation speed is 5400 rpm, and TPI (track density) is 11800, the servo pattern width T0 is 1.8 μs, and the sampling cycle Ts is 185 μs. In this case, ΔT=0.0097*v based on the above mentioned formula (9), and with this speed correction the demodulation position is calculated using the formula (7)

and formula (8). FIG. 20 shows the relationship between the demodulation positions (calculated positions) and the real positions after correction when the speed is 20 tracks/sample. Compared with the prior art in FIG. 7 where correction is not performed, the demodulation positions and the real positions match in FIG. 20, because of speed correction.

Figure 21:
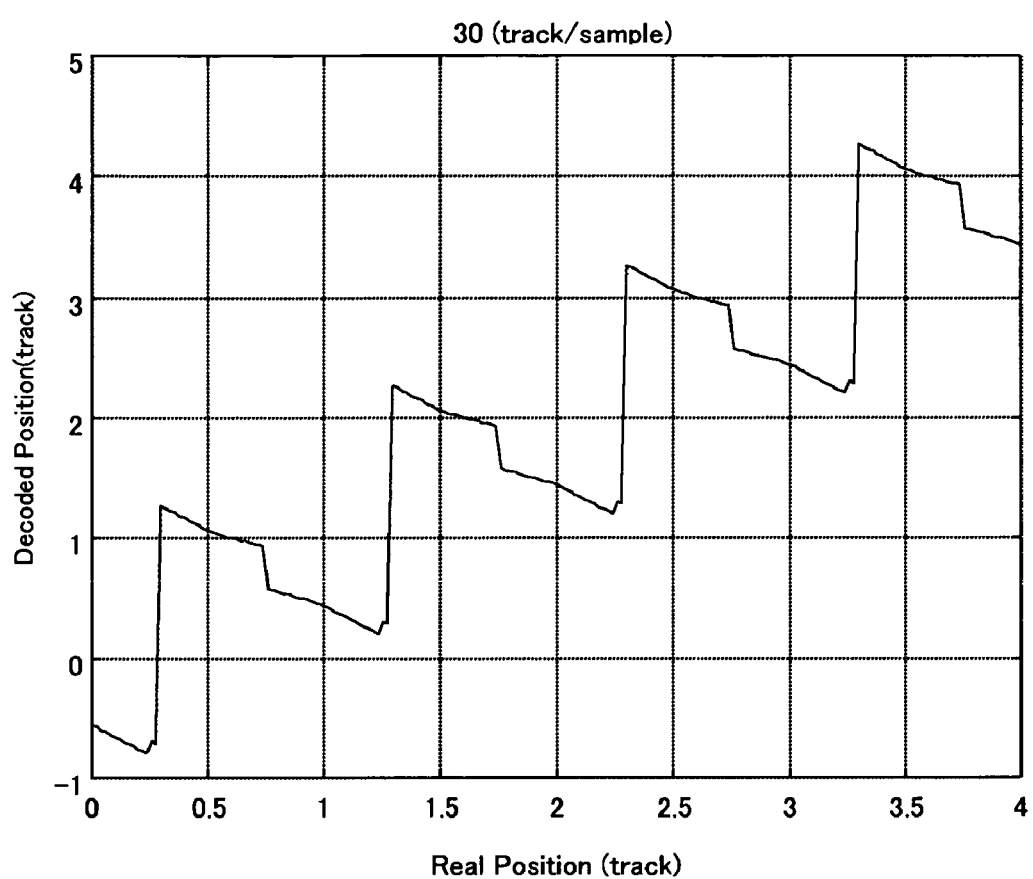
FIG. 21 is a diagram depicting the effect of the demodulation method not using PosN and PosQ of the present invention.

FIG. 21 shows the relationship between the demodulation positions (calculated positions) and the real positions after correction when the demodulation positions are calculated with the speed at 30 tracks/sample under the same conditions as FIG. 20. As FIG. 21 shows, if the speed is fast, the demodulation positions do not match the real positions even after speed correction is performed. Therefore, as mentioned above, when the speed is higher than the threshold speed, it is effective not to include PosN and PosQ in the calculation of the demodulation positions as in the formula (10).

Figure 22:
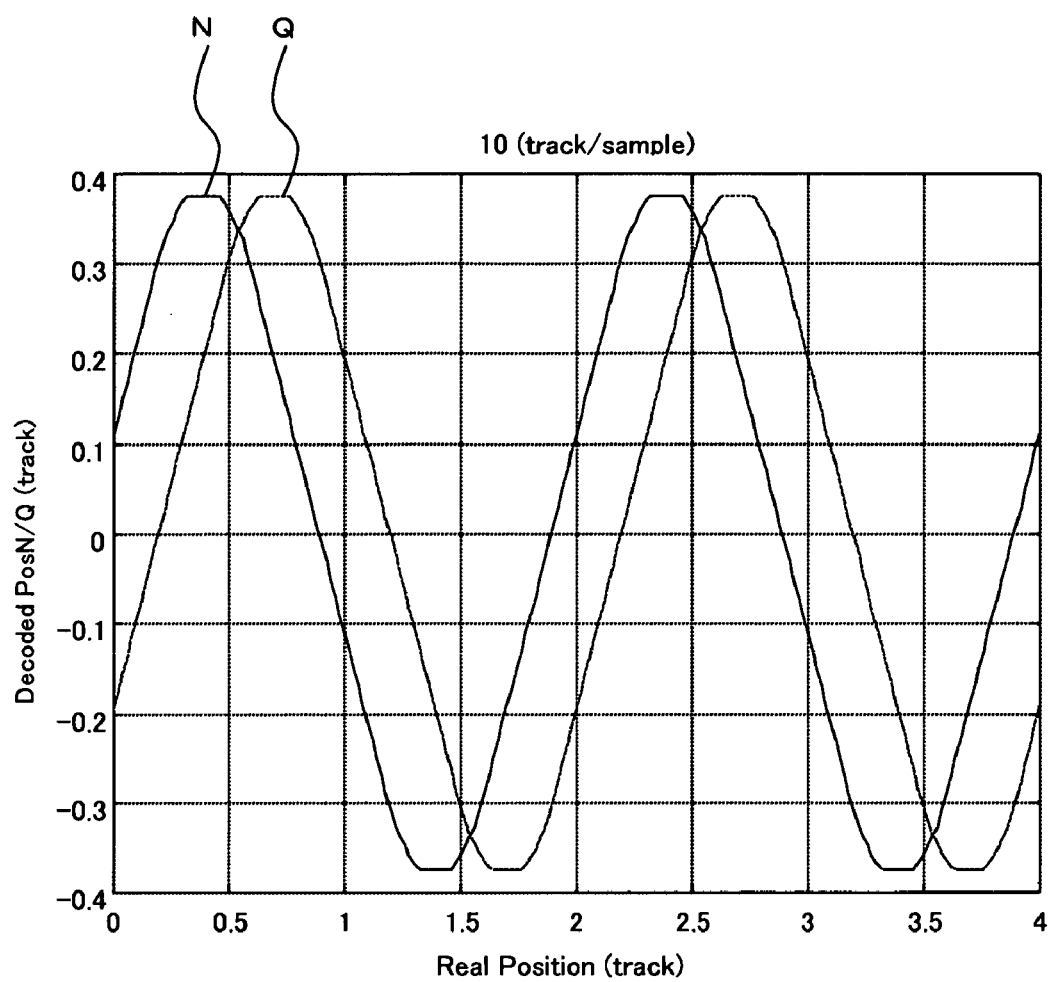
FIG. 22 is a diagram depicting PosN and PosQ for describing the effect of the reference position of the present invention.
Figure 24:
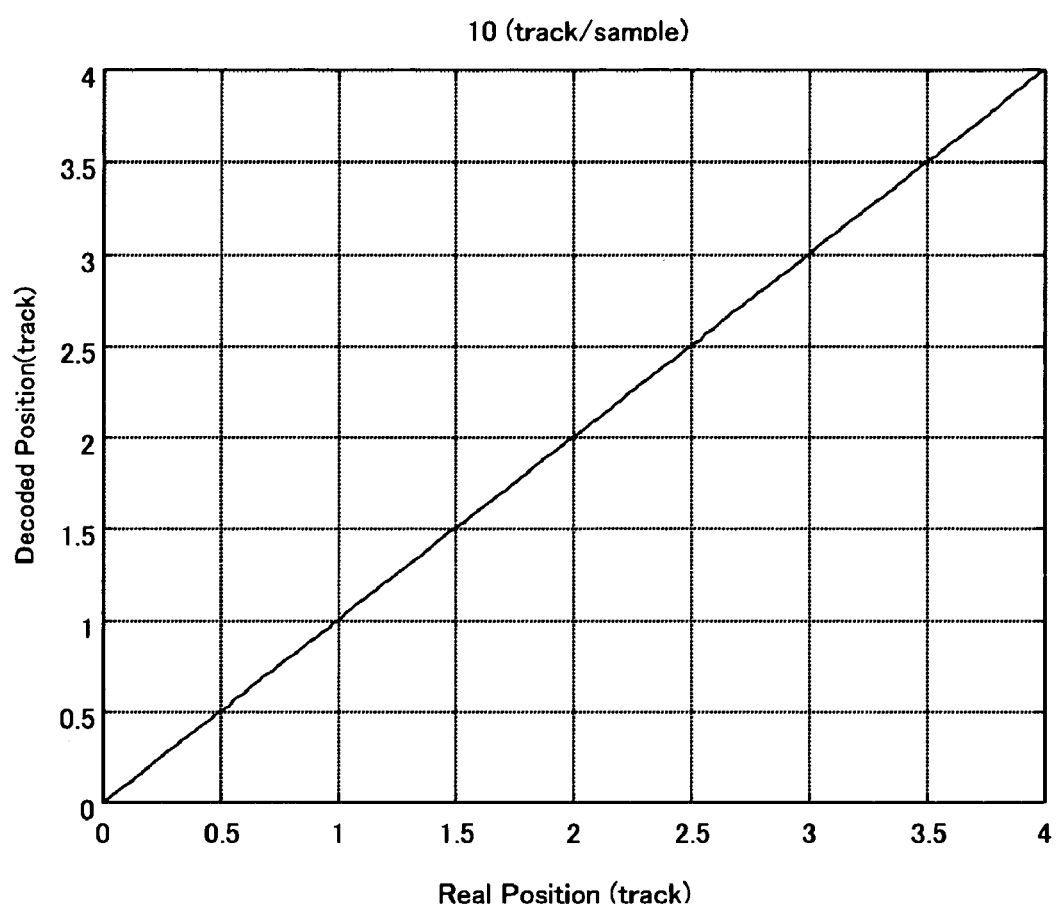
FIG. 24 is a diagram depicting an embodiment for describing the effect of the reference position of the present invention.
Figure 25:
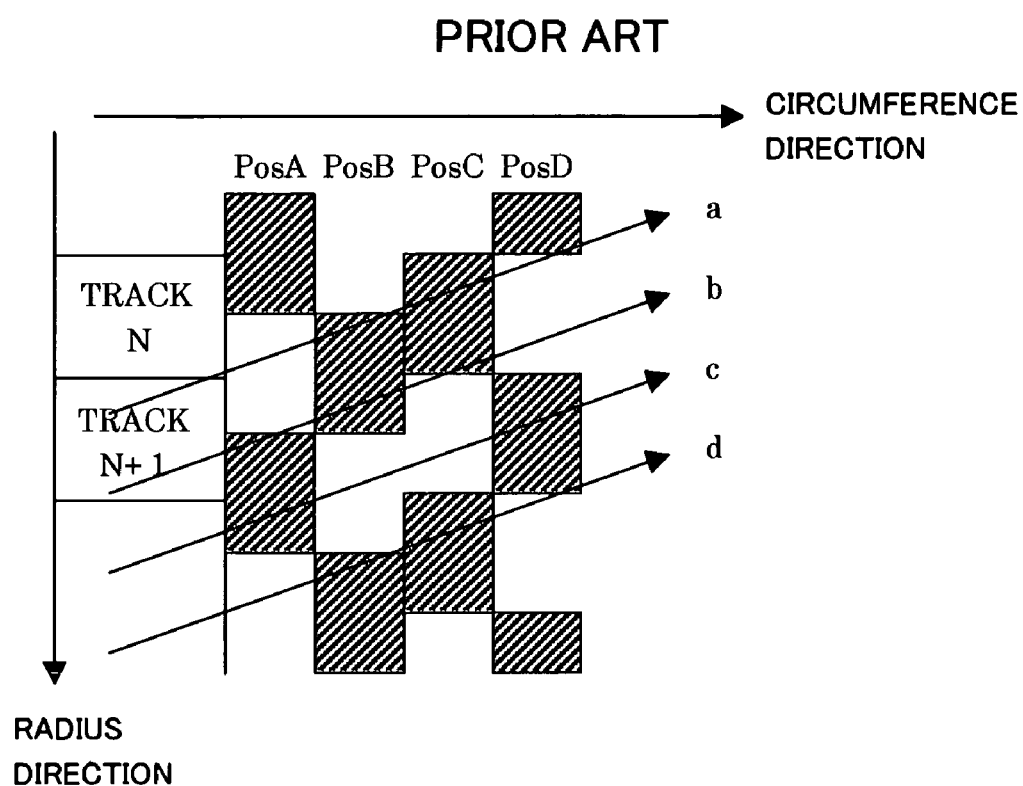
FIG. 25 is a diagram depicting the servo pattern for describing the conventional position demodulation method.
Figure 26:
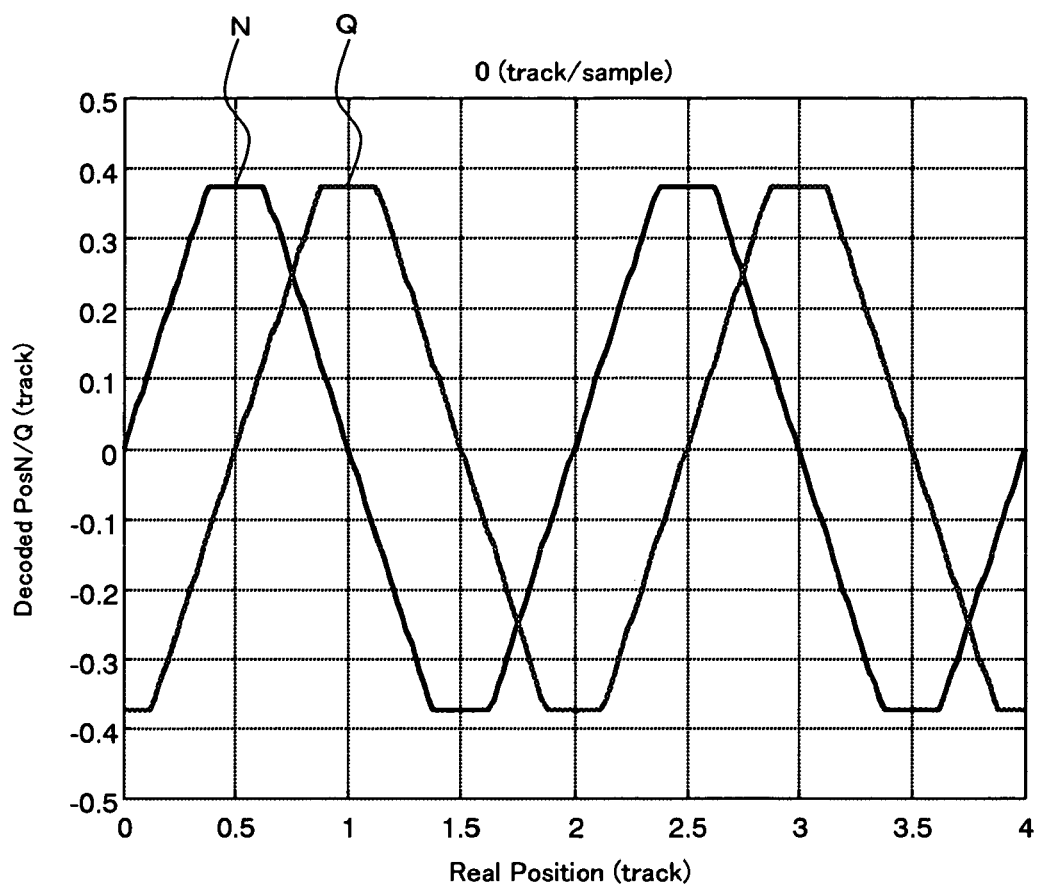
FIG. 26 is a diagram depicting two-phase position signals for describing the conventional position demodulation method.

FIG. 22 and FIG. 24 are diagrams depicting other embodiments of the present invention. That is, in the 3.5 inch magnetic disk unit, rotation speed is 5400 rpm, TPI (track density) is 11800, the servo pattern width TO is 1.8 μs, and the sampling cycle Ts is 185 μs. In this case, as described with reference to FIG. 17, the reference position is set to the least significant bit of the track number. FIG. 22 shows PosN and PosQ when the speed at this time is 10 tracks/sample.

Figure 23:
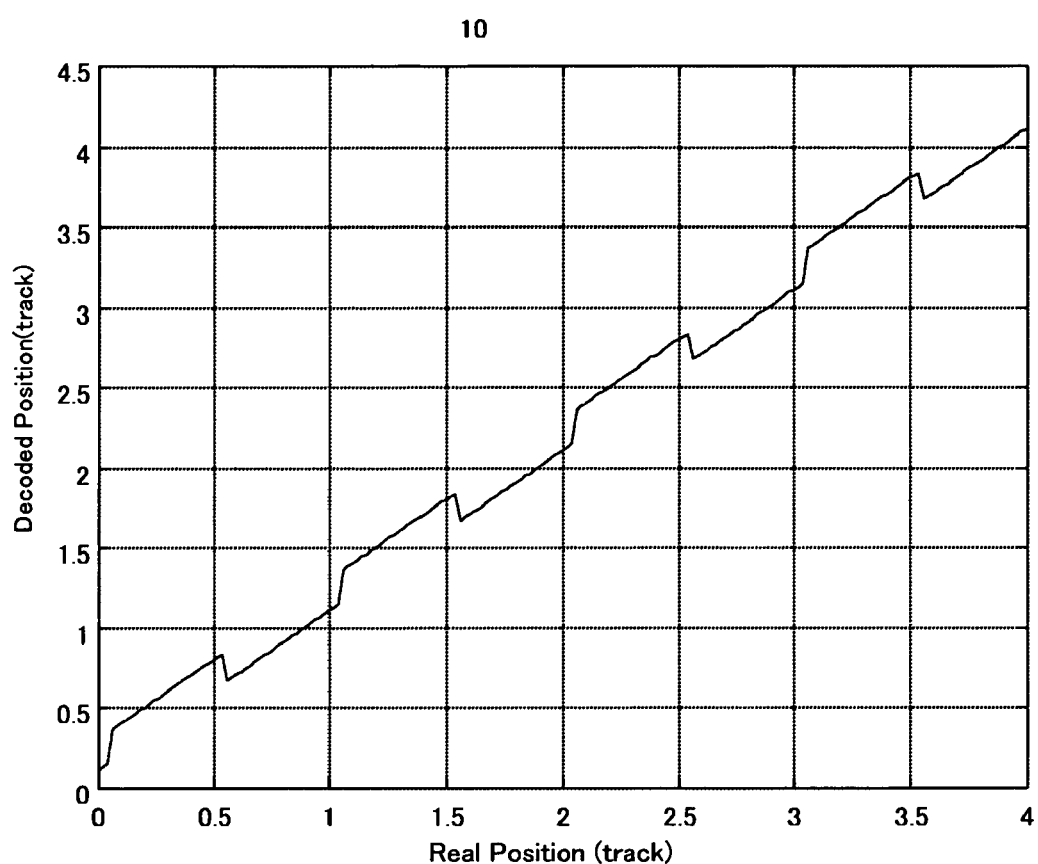
FIG. 23 is a diagram depicting a comparison example for describing the effect of the reference position of the present invention.

FIG. 23 shows the relationship between the demodulation positions calculated by the conventional demodulation calculation method which does not perform speed correction as a comparison example. FIG. 24 shows the relationship between the demodulation positions (calculated positions) calculated using the speed correction based on the above mentioned formula (16) and formula (17) and real positions. Compared with the prior art which does not perform speed correction shown in FIG. 23, the demodulation positions match the real positions in the case of FIG. 24, because of the speed correction.

[Other Embodiments]

In addition to the above mentioned embodiment, the following variant forms are possible for the present invention.

(1) The servo information on two-phases of PosN and PosQ was described, but the present invention can be applied to the servo information on one-phase and the servo information on three or more phases.

(2) Another position can be used as the reference position.

The present invention was described with the embodiments, but various modifications are possible, and these are not excluded from the scope of the present invention.

As described above, the present invention can present the following effects.

(1) The position can be demodulated accurately by correcting the demodulation result with a correction value which depends on the moving speed of the head.

(2) Since the correction value depends on the moving speed of the head, the position can be demodulated accurately just like a prior art when the moving speed is zero, speed correction can be easily added to the conventional modulation calculation, and implementation is also easy.

What is claimed is:

1. A head positioning control method for a disk device for positioning a head to a predetermined position of a disk, comprising:

a step of demodulating a position signal of said disk read by said head;

a step of calculating the demodulation position according to said demodulation result;

a step of calculating control quality according to the position errors between said demodulation position and a target position and controlling actuator which drives said head;

wherein said calculation step comprises a step of correcting said demodulation result including PosN and PosQ obtained by a four phase offset signal of said position signal with a dynamically-obtained correction value which depends on an actual moving speed of said head and obtaining the demodulation position; and a step of detecting said moving speed of the head based on said position signal read by said head, wherein said demodulation step further comprises:

a step of demodulating track number and offset information from said position signal, and said calculation step comprises:

a step of selecting said track number as said demodulation position when the moving speed of said head is faster than a predetermined speed; and a step of calculating a demodulation position by correcting said PosN and PosQ with said correction value obtained by compensated moving speed with a gain according to recording positions of the offset information in said position signal of said disk.

2. The head positioning control method according to claim 1, wherein said demodulation step comprises:

a step of demodulating a first position information and a second position information, which have different phases from each other, from said position signal; and said calculation step comprises:

a step of comparing said first position information and said second position information;

a step of correcting said first position information with a first correction value, which depends on the moving speed of said head, according to said comparison result; and a step correcting said second position information with a second correction value, which depends on the moving speed of said head, according to said comparison result.

3. The head positioning control method according to claim 1, wherein said demodulation step comprises:

a step of demodulating a track number and offset information from said position signal; and said calculation step comprises:

a step of correcting said offset information with a correction value where gain, which depends on the recording position of said offset information, is added to the moving speed of said head with the recording position of said track number as a reference.

4. The head positioning control method according to claim 1, wherein said demodulating position signal of a magnetic disk read by a magnetic head.

5. A head positioning control device for a disk device for positioning a head to a predetermined position of a disk by driving an actuator, comprising:

a demodulation circuit which demodulates a position signal of said disk read by said head; and a control circuit which calculates a demodulation position according to said demodulation result and controls the actuator for driving said head by calculating control quantity according to the position errors between said demodulation position and the target position, wherein said control circuit corrects said demodulation result including PosN and PosQ obtained by a four phase offset signal of said position signal with a dynamically-obtained correction value which depends on an actual moving speed of said head and calculates said demodulation position; and wherein said control circuit further detects said moving speed of the head based on said position signal read by said head, wherein said demodulation circuit demodulates a track number and offset information from said position signal, and wherein said control circuit selects said track number as said demodulation position when the moving speed of said head is faster than a predetermined speed, and calculates a demodulation position by correcting said PosN and PosQ with said correction value obtained by compensated moving speed with a gain according to recording positions of the offset information in said position signal of said disk.

6. The head positioning control device according to claim 5, wherein said demodulation circuit demodulates a first position information and a second position information, which have different phases from each other, from said position signal; and said control circuit compares said first position information and said second position information, corrects said first position information with a first correction value, which depends on the moving speed of said head, according to said comparison result, and corrects said second position information with a second correction value, which depends on the moving speed of said head, according to said comparison result.

7. The head positioning control device according to claim 5, wherein said demodulation circuit demodulates a track number and offset information from said position signal; and said control circuit corrects said offset information with a correction value where gain, which depends on the recording position of said offset information, is added to the moving speed of said head with the recording position of said track number as a reference.

8. The head positioning control device according to claim 5, wherein said demodulation circuit demodulates a position signal of a magnetic disk read by a magnetic head.

9. A disk device comprising;

a head for at least reading a disk;

an actuator for positioning said head to a predetermined position of said disk;

a demodulation circuit which demodulates a position signal of said disk read by said head; and a control circuit which calculates a demodulation position according to said demodulation result and controls the actuator for driving said head by calculating control quantity according to the position errors between said demodulation position and the target position, wherein said control circuit corrects said demodulation result including PosN and PosQ obtained by a four phase offset signal of said position signal with a dynamically-obtained correction value which depends on an actual moving speed of said head and calculates said demodulation position; and wherein said control circuit further detects said moving speed of the head based on said position signal read by said head, wherein said demodulation circuit demodulates a track number and offset information from said position signal, and wherein said control circuit selects said track number as said demodulation position when the moving speed of said head is faster than a predetermined speed, and calculates demodulation position by correcting said PosN and Pos Q with said correction value obtained by compensated moving speed with a gain according to recording positions of the offset information in said position signal of said disk.

10. The disk device according to claim 9, wherein said demodulation circuit demodulates a first position information and a second position information, which have different phases from each other, from said position signal; and said control circuit compares said first position information and said second position information, corrects said first position information with a first correction value, which depends on the moving speed of said head, according to said comparison result, and corrects said second position information with a second correction value, which depends on the moving speed of said head, according to said comparison result.

11. The disk device according to claim 9, wherein said demodulation circuit demodulates a track number and offset information from said position signal; and said control circuit corrects said offset information with a correction value where gain, which depends on the recording position of said offset information, is added to the moving speed of said head with the recording position of said track number as a reference.

12. The disk device according to claim 9, wherein said demodulation circuit demodulates a position signal of a magnetic disk read by a magnetic head.

* * * * *